(12) United States Patent
Obata et al.

(10) Patent No.: US 6,390,063 B1
(45) Date of Patent: May 21, 2002

(54) INTAKE-AIR QUANTITY CONTROL APPARATUS FOR INTERNAL COMBUSTION ENGINE WITH VARIABLE VALVE TIMING SYSTEM

(75) Inventors: Takeaki Obata; Takao Kawasaki, both of Kanagawa; Masahiro Arai, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/598,991

(22) Filed: Jun. 22, 2000

(30) Foreign Application Priority Data

Jun. 23, 1999 (JP) ............................................ 11-177124

(51) Int. Cl.[7] ............................ F01L 9/04; F02D 13/02; F02D 41/04

(52) U.S. Cl. .................. 123/399; 123/90.11; 123/90.15

(58) Field of Search ................ 123/90.11, 90.15–90.18, 123/352, 361, 399

(56) References Cited

U.S. PATENT DOCUMENTS

| | | | | |
|---|---|---|---|---|
| 5,143,037 A | * | 9/1992 | Sawamoto | 123/399 |
| 5,168,851 A | * | 12/1992 | Itoyama et al. | 123/399 |
| 6,000,375 A | * | 12/1999 | Isobe | 123/399 X |
| 6,039,026 A | * | 3/2000 | Shiraishi et al. | 123/399 |
| 6,234,144 B1 | * | 5/2001 | Yamaguchi et al. | 123/399 |

FOREIGN PATENT DOCUMENTS

JP            10-311231        11/1998

* cited by examiner

Primary Examiner—Tony M. Argenbright
(74) Attorney, Agent, or Firm—Foley & Lardner

(57) ABSTRACT

In an intake-air quantity control apparatus for an internal combustion engine with a variable valve timing system, an electronic engine control module has a microprocessor programmed to perform selecting one of a first control mode in which an intake-air quantity of the engine is controlled by adjusting the throttle opening, and a second control mode in which an intake-air quantity of the engine is controlled by adjusting the intake-valve closure timing. The microprocessor is programmed to perform a number of calculating and setting steps regarding the intake-air quantity and in-take valve closure timing.

21 Claims, 17 Drawing Sheets

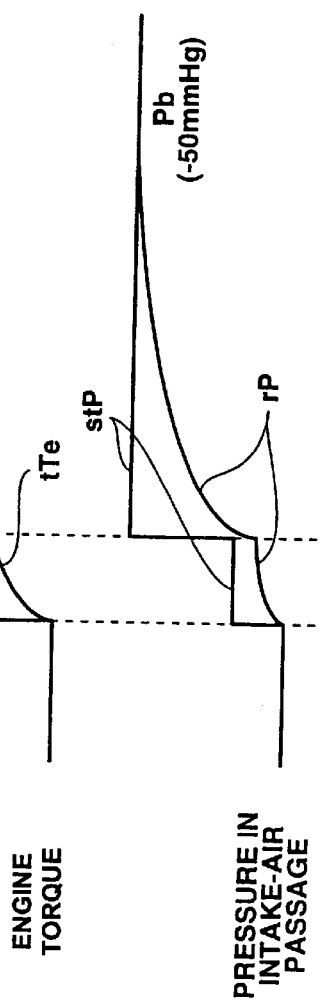
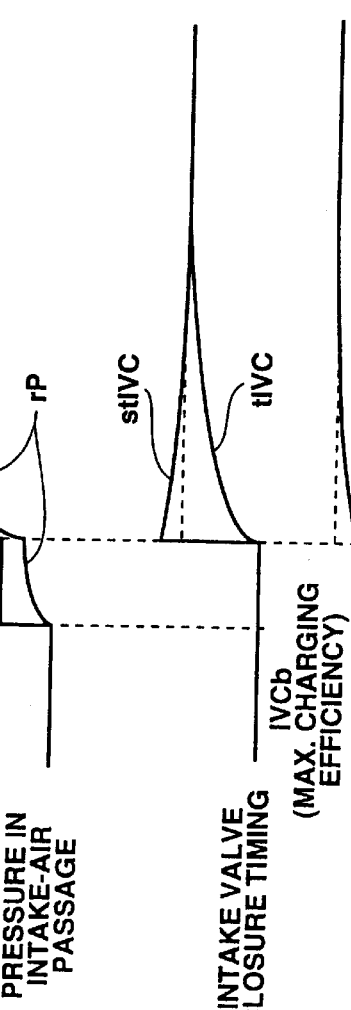
FIG.4A ACCELERATOR OPENING
FIG.4B ENGINE TORQUE
FIG.4C PRESSURE IN INTAKE-AIR PASSAGE
FIG.4D INTAKE VALVE CLOSURE TIMING
FIG.4E THROTTLE OPENING

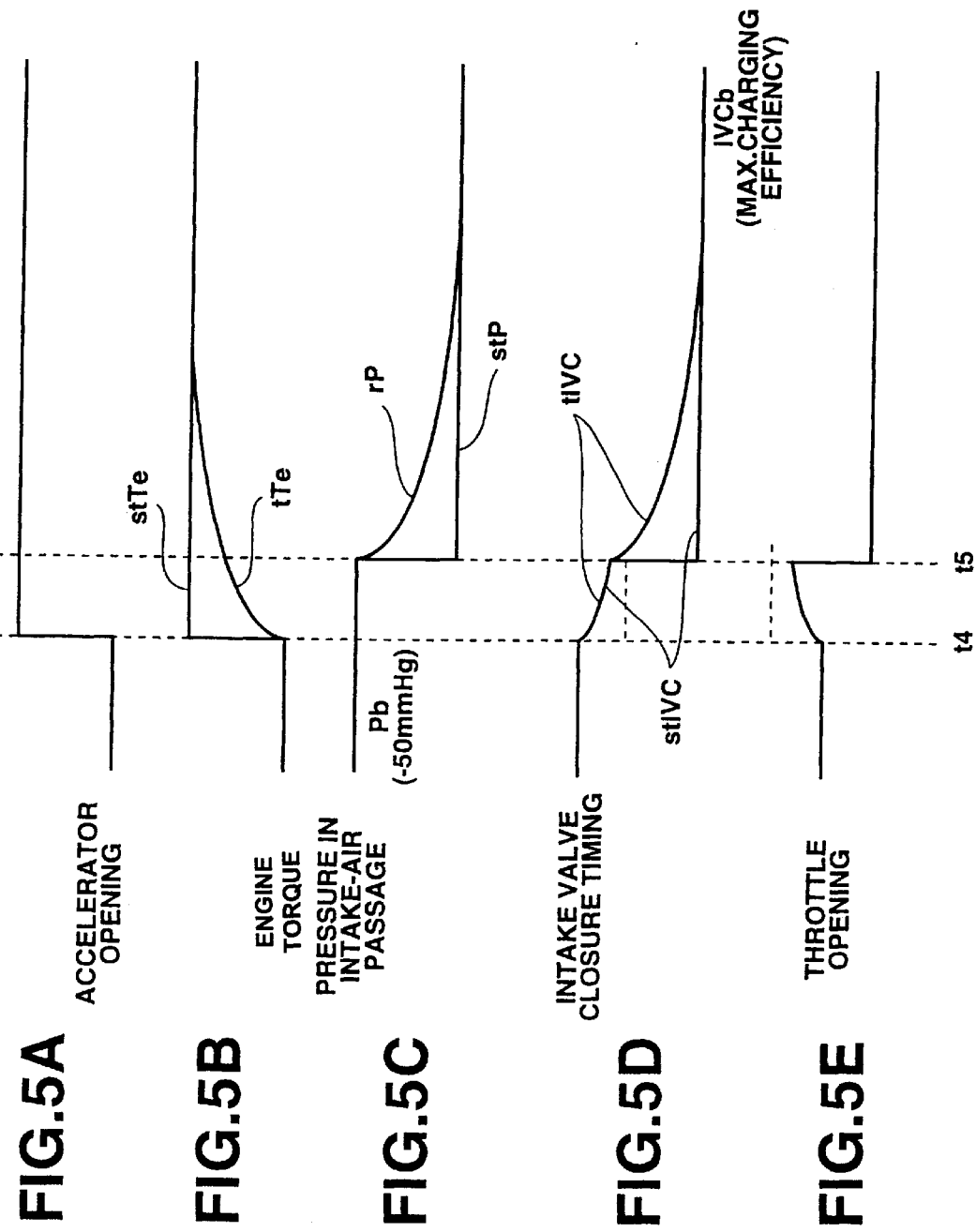

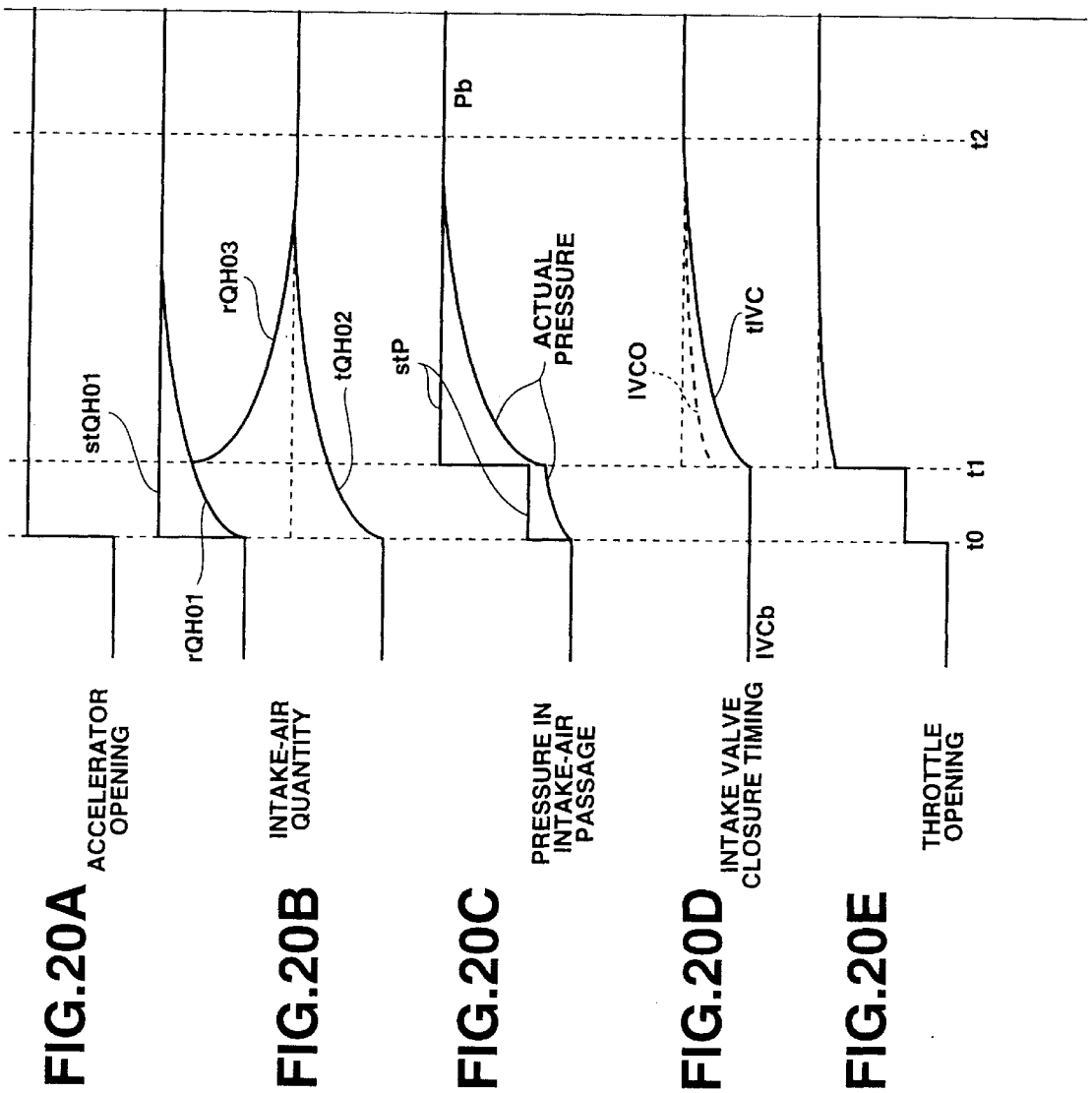

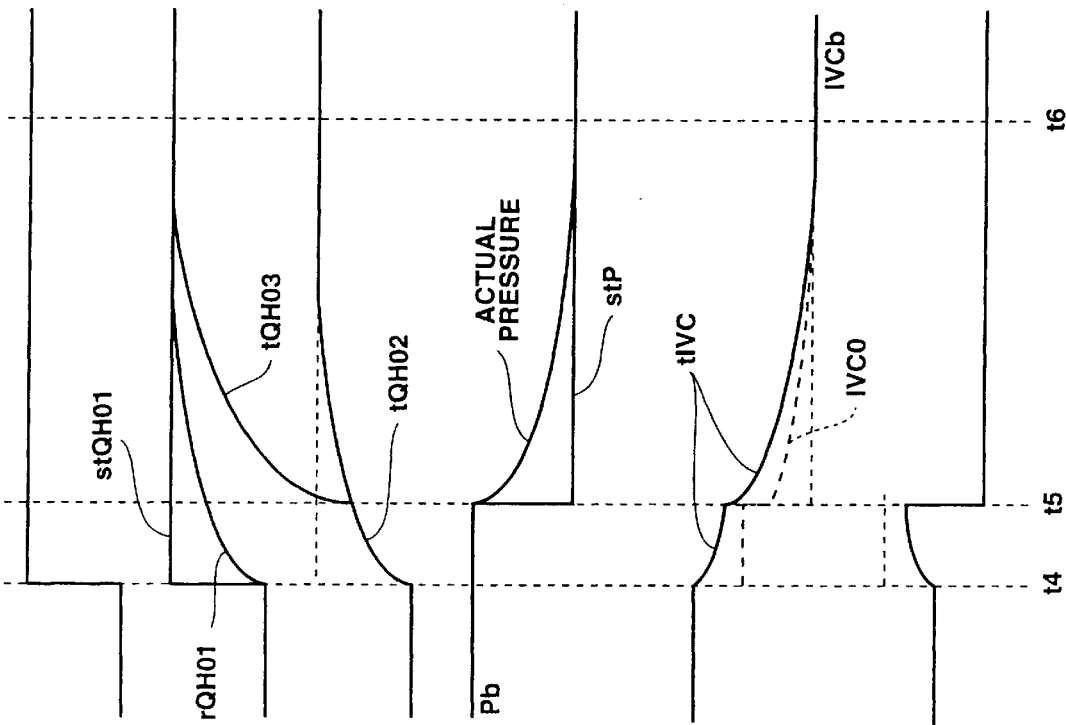

INTAKE-AIR QUANTITY CONTROL APPARATUS FOR INTERNAL COMBUSTION ENGINE WITH VARIABLE VALVE TIMING SYSTEM

BACKGROUND OF THE INVENTION

1. Field of the Invention

The present invention relates to the improvements of an intake-air quantity control apparatus for an internal combustion engine equipped with a variable valve timing system capable of electronically arbitrarily controlling an intake- and/or exhaust-valve timing depending on engine/vehicle operating conditions, and specifically to techniques for controlling engine power output (a quantity of intake air entering an internal combustion engine) by adjusting an intake-valve open timing (often abbreviated to "IVO") and an intake-valve closure timing (often abbreviated to "IVC").

2. Description of the Prior Art

In recent years, there have been proposed and developed various electronically-controlled variable valve timing systems which are capable of operating intake and exhaust valves electromagnetically. One such electronically-controlled variable valve timing system for an internal combustion engine having electromagnetically-powered valve units has been disclosed in Japanese Patent Provisional Publication No. 10-311231. In the Japanese Patent Provisional Publication No. 10-311231, each of intake and exhaust valves is comprised of an electromagnetic solenoid valve whose opening and closing are achieved by way of an electromagnetic force instead of the use of a typical cam-drive mechanism. Thus, an intake-valve open timing (IVO), an intake-valve open timing (IVO), an exhaust-valve open timing (EVO), and an exhaust-valve closure timing (EVC) can be continually changed in response to command signals from an electronic control module (ECM). In such internal combustion engines with a variable valve timing control system having electromagnetically-powered valve units, an intake-air quantity can be adjusted by properly controlling or managing an intake valve timing (IVO and/or IVC), in place of throttle-opening adjustment. In this type of engines with electromagnetically-powered engine valve units, a throttle valve is often eliminated, or a throttle valve is installed on the engine only for the purpose of generation of a negative pressure in an intake-air passage. Suppose an internal pressure in the intake-air passage reaches a pressure level close to atmospheric pressure with the throttle kept at an extremely less throttle opening. In this case, the intake-air quantity control system based on adjustment of an intake-valve opening time period (a time interval between IVO and IVC) is superior to that based on only the throttle-opening adjustment, from the viewpoint of reduced pumping loss and reduced fuel consumption rate.

SUMMARY OF THE INVENTION

In the previously-described internal combustion engine with a variable valve timing system capable of electronically arbitrarily controlling an intake- and/or exhaust-valve timing, when the engine is operated under a particular condition in which an internal pressure in an intake-air passage is kept at a pressure level substantially corresponding to atmospheric pressure, there is a tendency for a flow velocity of air fuel mixture drawn into the engine to reduce as compared to an internal engine utilizing the throttle-opening adjustment to provide intake-air quantity control. This lowers gas flow (in-cylinder mixture flow) in the combustion chamber, thus lowering the combustion stability. Each car now has an evaporative emission control system as one of automotive emission control systems. This is a system that captures or traps any fuel vapors coming from a fuel tank and prevents them from escaping into atmosphere. A typical evaporative emission control system for an internal combustion engine, has a carbon or charcoal canister filled with activated carbon or charcoal for temporarily storing, trapping or adsorbing fuel vapors emitted from a fuel tank, and a purge control valve disposed in a purge line connecting an induction system with the canister. Generally, the action of clearing or removing the trapped fuel vapor from the canister is called "purging". Usually, when predetermined engine operating conditions are satisfied after the engine is started, the purge control valve is opened and thus engine vacuum (negative pressure) is admitted to the canister. Thus, the engine vacuum draws fresh air up through the canister via an air port. The fresh air flowing through the interior of the canister, picks up these trapped fuel vapors, and removes the trapped fuel vapors from the canister, and thereafter the purge gas is burned in the combustion chamber. As discussed above, the negative pressure for "purging" is necessary. For this purpose, it is advantageous to provide an intake-air throttle valve (simply, a throttle) in an intake-air passage. Under a first specified condition where a combustion quality deteriorates, for example, during cold engine operation, the intake-air quantity control system (hereinafter referred to as a "first control mode system") based on throttle-opening adjustment is effective, because it is possible to increase the flow velocity of air-fuel mixture while maintaining the internal pressure in the intake-air passage at a predetermined negative pressure level by controlling or managing the intake-air quantity by means of the throttle. The intake-air quantity control system based on throttle-opening adjustment enhances the combustion quality under the first specified condition. On the other hand, under a second specified condition where the combustion quality (combustion stability) of the engine is good, for example, after engine warm-up, the intake-air quantity control system (hereinafter referred to as a "second control mode system") based on adjustment of an intake-valve opening time period (a time interval between IVO and IVC) and/or adjustment of an exhaust-valve opening time period (a time interval between EVO and EVC) is effective. This is because it is possible to lower the fuel consumption rate by executing the second control mode based on adjustment of the intake-valve opening time period and/or adjustment of the exhaust-valve opening time period while maintaining the internal pressure in the intake-air passage at a pressure level substantially corresponding to atmospheric pressure with the throttle held at an extremely less throttle opening. However, in an electronically-controlled engine which is switchable between the first and second control modes during operation of the engine, there is a tendency for a difference in engine power output (engine output torque) to occur during switching between the first and second control modes. This deteriorates vehicle driveability. Such a difference in engine power output is caused mainly by the following two factors. First, the pumping loss and combustion efficiency given during the first control mode are different from those given during the second control mode, and thus there is a difference in a quantity of air required to obtain a desired engine power output, between the first and second control modes. Additionally, during switching between the first and second control modes, the internal pressure in the intake-air passage tends to fluctuate or vary transiently, and therefore a required air quantity also fluctuates transiently. Second, a response characteristic of the first control mode system are different from that of the second control mode system. In the first control mode system (the intake-air quantity control system based on adjustment of the intake-valve opening time period and/or adjustment of the exhaust-valve opening time period), a volumetric capacity from the throttle to the intake valve acts as a time-delay element, and thus an actual intake-air quantity (the value of the controlled quantity) is brought closer to a desired intake-air quantity with a time delay. On the other hand, in the second control mode system (the intake-air quantity control system based on throttle-opening adjustment), it is possible to bring the actual intake-air quantity closer to the desired intake-air quantity without any time delay.

Accordingly, it is an object of the invention to provide an intake-air quantity control apparatus for an internal combustion engine with a variable valve timing system, which avoids the aforementioned disadvantages of the prior art.

It is another object of the invention to provide an intake-air quantity control apparatus for an internal combustion engine with a variable valve timing system, which is capable of achieving smooth switching between a first control mode (an intake-air quantity control mode based on at least adjustment of an intake-valve opening time period) and a second control mode (an intake-air quantity control mode based on throttle-opening adjustment) without any torque difference during operation of the engine.

In order to accomplish the aforementioned and other objects of the present invention, an intake-air quantity control apparatus for an internal combustion engine with a variable valve timing system comprises a throttle valve disposed in an intake-air passage of the engine and controlled so that a throttle opening of the throttle valve is brought closer to a target throttle opening, an intake valve disposed between the intake-air passage and a combustion chamber of the engine and controlled so that an intake-valve closure timing of said intake valve is brought close to a target intake-valve closure timing, and a microprocessor programmed to perform the following:

selecting one of a first control mode in which an intake-air quantity of the engine is controlled by adjusting the throttle opening of the throttle valve, and a second control mode in which an intake-air quantity of the engine is controlled by adjusting the intake-valve closure timing of said intake valve;

calculating a steady-state target engine torque based on operating conditions of the engine, the steady-state target engine torque indicating a steady-state target value of engine torque;

calculating a target engine torque based on the steady-state target engine torque, the target engine torque following the steady-state target engine torque with a predetermined time delay;

setting a steady-state target intake-valve closure timing at a basic intake-valve closure timing when the first control mode is selected, the steady-state target intake-valve closure timing indicating a steady-state target value of the intake-valve closure timing;

calculating a steady-state target intake-air-passage internal pressure based on both the steady-state target engine torque and the steady-state target intake-valve closure timing when the first control mode is selected, the steady-state target intake-air-passage internal pressure indicating a steady-state target value of an internal pressure in the intake-air passage;

setting the steady-state target intake-air-passage internal pressure at a basic pressure when the second control mode is selected;

calculating the steady-state target intake-valve closure timing based on both the target engine torque and the steady-state target intake-air-passage internal pressure when the second control mode is selected;

obtaining a real intake-air-passage internal pressure, the real intake-air-passage internal pressure indicating an actual internal pressure in the intake-air passage;

calculating the target throttle opening based on both the steady-state target intake-valve closure timing and the steady-state target intake-air-passage internal pressure; and calculating the target intake-valve closure timing based on both the target engine torque and the real intake-air-passage internal pressure.

According to another aspect of the invention, an intake-air quantity control apparatus for an internal combustion engine with a variable valve timing system comprises a throttle valve disposed in an intake-air passage of the engine and controlled so that a throttle opening of the throttle valve is brought closer to a target throttle opening, an intake valve disposed between the intake-air passage and a combustion chamber of the engine and controlled so that an intake-valve closure timing of the intake valve is brought close to a target intake-valve closure timing, and a microprocessor programmed to perform the following:

selecting one of a first control mode in which an intake-air quantity of the engine is controlled by adjusting the throttle opening of the throttle valve, and a second control mode in which an intake-air quantity of the engine is controlled by adjusting the intake valve closure timing of the intake valve;

calculating a steady-state target intake-air quantity based on operating conditions of the engine, the steady-state target intake-air quantity indicating a steady-state target value of intake-air quantity needed when the first control mode is selected;

calculating a target intake-air quantity based on the steady-state target intake-air quantity, the target intake-air quantity indicating a target value of intake-air quantity needed when the second control mode is selected;

calculating the target throttle opening based on the steady-state target intake-air quantity when the first control mode is selected;

setting the target intake-valve closure timing at a basic intake-valve closure timing when the first control mode is selected;

setting the target throttle opening at a predetermined throttle opening when the second control mode is selected, the predetermined throttle opening indicating a throttle opening of the throttle valve at which the internal pressure in the intake-air passage becomes the basic pressure; and calculating the target intake-valve closure timing based on the target intake-air quantity when the second control mode is selected.

BRIEF DESCRIPTION OF THE DRAWINGS

FIGS. 4A–4E are time charts showing variations in various engine and vehicle parameters, namely accelerator opening (APS), engine torque (stTe, tTe), intake-air-passage internal pressure (stP, rP), intake-valve closure timing (stIVC, tIVC), and throttle opening (tTVO), obtained when the system operating mode is switched from first to second control mode during execution of the intake-air quantity control program of FIG. 3.

FIGS. 5A–5E are time charts showing variations in various engine and vehicle parameters, namely accelerator opening (APS), engine torque (stTe, tTe), intake-air-passage internal pressure (stP, rP), intake-valve closure timing (stIVC, tIVC), and throttle opening (tTVO), obtained when the system operating mode is switched from second to first control mode during execution of the intake-air quantity control program of FIG. 3.

FIG. 17 is a characteristic map showing the relationship between a target throttle opening tTVO and a throttle opening area At.

FIGS. 20A–20E are time charts showing variations in various engine and vehicle parameters, namely accelerator opening (APS), intake-air quantity (stQH01, rQH01, tQH02, tQH03), intake-air-passage internal pressure (stP, actual internal pressure in the intake-air passage), intake-valve closure timing (IVC0, tIVC), and throttle opening (tTVO), obtained when the system operating mode is switched from first to second control mode during execution of the intake-air quantity control program of FIG. 6.

FIGS. 21A–21E are time charts showing variations in various engine and vehicle parameters, namely accelerator opening (APS), intake-air quantity (stQH01, rQH01, tQH02, tQH03), intake-air-passage internal pressure (stP, actual internal pressure in the intake-air passage), intake-valve closure timing (IVC0, tIVC), and throttle opening (tTVO), obtained when the system operating mode is switched from second to first control mode during execution of the intake-air quantity control program of FIG. 6.

DESCRIPTION OF THE PREFERRED EMBODIMENTS

Figure 1:
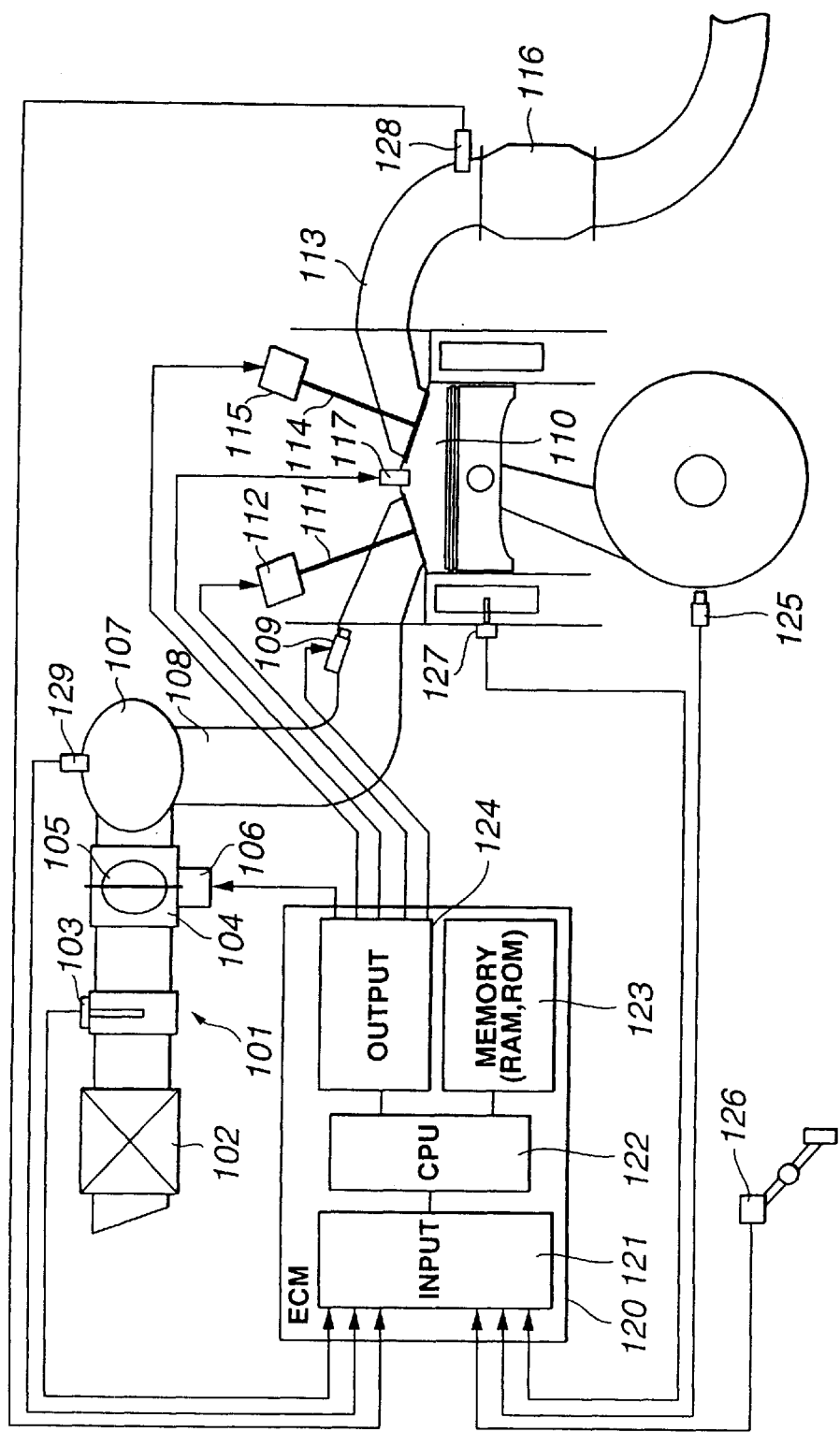
FIG. 1 is a system arrangement of an electronic engine control system (an electronic concentrated engine control system) to which an intake-air quantity control apparatus of the invention can be applied.
Figure 2:
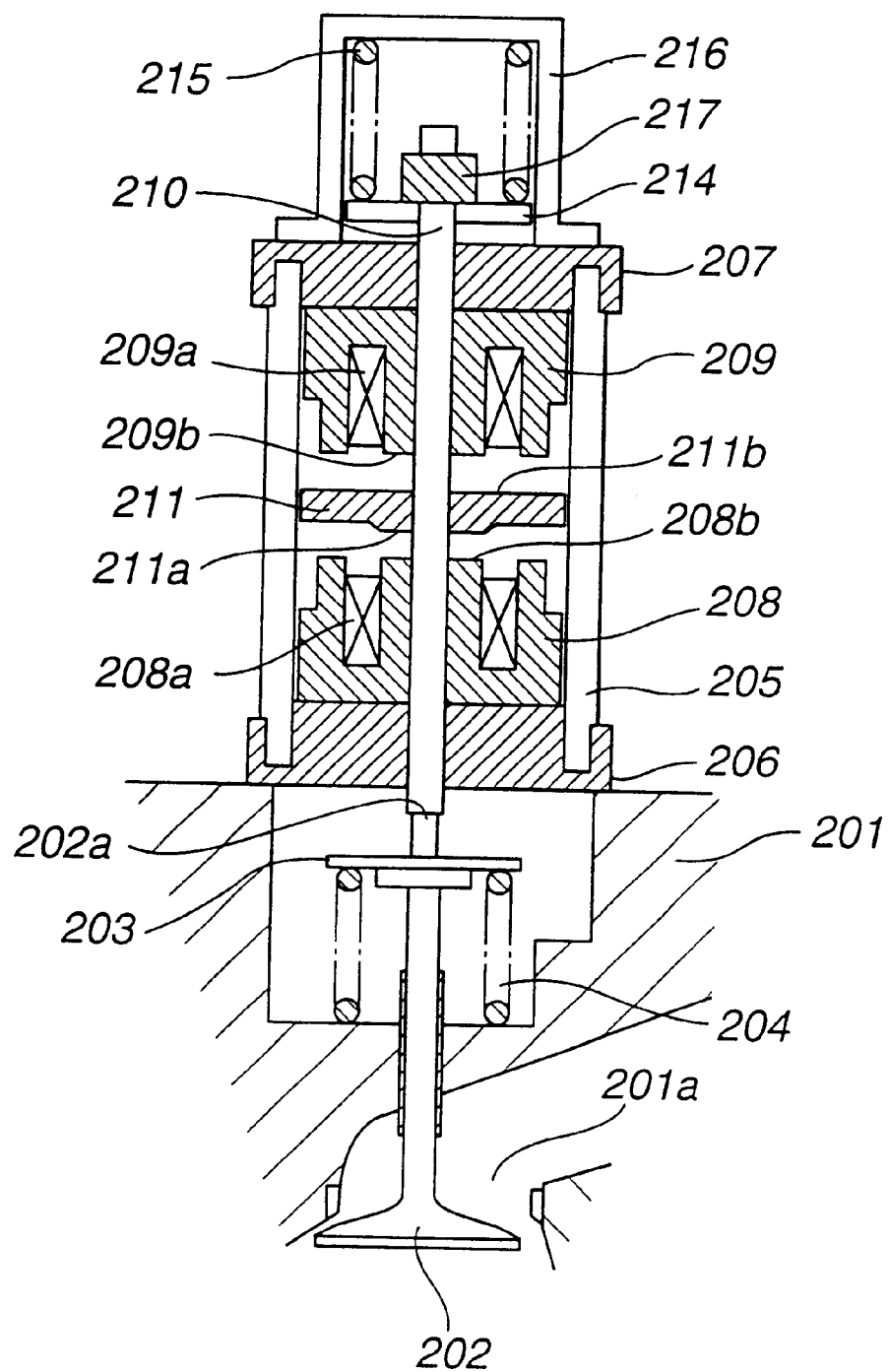
FIG. 2 is a longitudinal cross sectional view illustrating an electromagnetically-powered engine valve unit employed in the intake-air quantity control apparatus of the embodiment.

Referring now to the drawings, particularly to FIG. 1, the intake-air quantity control apparatus of the embodiment is exemplified in a spark-ignited internal combustion engine with electromagnetically-powered valve operating units. An air cleaner 102, an air flow sensor or an air flow meter 103, and a throttle chamber 104 are provided in an intake-air passage 101, in that order. An electronically-controlled throttle valve 105 is provided in the throttle chamber 104 disposed between the air-flow meter 103 and the collector 107. A throttle opening of the throttle valve 105 is adjusted by means of a throttle actuator 106. The downstream side of the throttle chamber 104 is connected to an intake-air collector 107 from which the intake-air passage 101 is branched into a plurality of branch passages 108 connected to respective engine cylinders. Individual fuel injectors 109 are provided at each of the branch passages 108, to inject fuel into the branch passages. A cylinder head of the engine is formed with an intake-valve port communicating with the branch passage 108 and an exhaust-valve port communicating with an exhaust passage 113. An intake valve 111 is located in the cylinder head and disposed between the branch passage 108 and a combustion chamber 110 for opening and closing the intake port, whereas an exhaust valve 114 is located in the cylinder head and disposed between the combustion chamber 110 and the exhaust passage 113 for opening and closing the exhaust port. The intake valve 111 is electromagnetically operated by an electromagnetic actuator 112, whereas the exhaust valve 113 is electromagnetically operated by an electromagnetic actuator 115. Each of the intake-valve unit (the intake valve and its actuator) and the exhaust-valve unit (the exhaust valve and its actuator) is constructed as an electromagnetically-powered valve operating unit as shown in FIG. 2. A spark plug 117 is screwed into a tapped hole of the cylinder head for each combustion chamber to ignite the air-fuel mixture in the combustion chamber. Hot burned gases from the engine cylinders are exhausted through the exhaust valve 114 into the exhaust passage 113, and then passes through a catalytic converter 116 to clean up the exhaust gas from the engine and to emit harmless gas into the atmosphere. The electronic/engine control module (ECM) 120 is provided to coordinate various engine functions, such as an electronic fuel-injection and ignition system, a throttle opening control, an intake-air quantity control, etc. The ECM 120 usually comprises a microcomputer. The ECM 120 includes an input port or an input interface 121, a microprocessor (CPU) 122, memories (RAM, ROM) 123, an output port or an output interface 124, drivers or driver circuits (not numbered), and the like. The driver circuits are often used for amplification of output signals from the ECM 120. The CPU 122 performs necessary arithmetic calculations, processes informational data, performs logical operations with stored data, and makes necessary decisions of acceptance. The memories 123 are constructed by a random-access memory (RAM) and a read-only memory (ROM). The ROM (fixed-value memory) permanently stores all necessary programs, various sorts of characteristic maps, theoretical values, and the like, while the RAM (operating-data memory) temporarily stores informational data during execution of the control program. For instance, data delivered by engine/vehicle sensors are stored in the RAM, until they are summoned by the CPU or superseded by more recent data. The input port 121 of the ECM 120 receives various engine/vehicle sensor signals from the air-flow meter 103, a crank angle sensor 125, an accelerator opening sensor 126, an engine temperature sensor 127, an air/fuel ratio sensor 128, and a pressure sensor 129. The air-flow meter 103 is located on the intake-air duct for detecting a quantity of intake air flowing through the air-flow meter and drawn into the engine. The crank angle sensor 125 is provided to monitor engine speed Ne as well as a relative position of the engine crankshaft. The accelerator opening sensor 126 is located near the accelerator to monitor an accelerator-pedal operating amount or an accelerator opening APS. A coolant temperature sensor is usually used as the engine temperature sensor 127. The coolant temperature sensor is mounted on the engine and usually screwed into one of top coolant passages to sense the actual operating temperature of the engine. The air/fuel ratio sensor 128, such as an oxygen sensor, is located in the exhaust passage 113 and disposed just upstream of the catalytic converter 116, to monitor or detect an air/fuel mixture ratio (often abbreviated to "A/F" ratio) based on the percentage of oxygen contained within the engine exhaust gases at all times when the engine is running, so that the ECM 120 can maintain the A/F ratio at as close to stoichiometric as possible, for complete combustion and minimum exhaust emissions. The pressure sensor 129 such as a manifold pressure sensor, is screwed into the collector 107 to measure or sense an internal pressure in the intake-air passage 101, precisely an internal pressure in the collector 107. The input informational data signals from the above engine/vehicle sensors 103, 125, 126, 127, 128 and 129 are used for the arithmetic and logical operations executed by the CPU 122. Actually, the CPU 122 of the ECM 120 performs various data processing actions such as the main intake-air quantity control routine shown in FIG. 3, or another main routine and subroutines shown in FIGS. 6, 7, 10, 11, 12, 13, 14, 18, or the subroutine shown in FIG. 22, which will be fully described later. The output port 124 of the ECM 120 is configured to be electronically connected often through the driver circuits to electrical loads, such as the throttle actuator 106, the fuel injector solenoids of the fuel injectors 109, the intake-valve side electromagnetic actuators 112, the exhaust-valve side electromagnetic actuators 115, and the spark plugs 117, for generating control command signals to operate these electrical loads. Concretely, the throttle actuator 106 is operated in response to a control command signal representative of a target throttle opening, output from the output port 124, so that the actual throttle opening of the throttle valve 105 is adjusted to the target throttle opening. The injector solenoid of each of the fuel injectors 109 included in an electronic fuel-injection system is energized in response to a fuel-injection signal from the ECM 120, to inject a desired amount of fuel that the air/fuel mixture ratio of air-fuel mixture formed in the combustion chamber 110 can be maintained at as close to a predetermined A/F ratio (i.e., a stoichiometric A/F ratio) as possible, at a predetermined injection timing. The individual spark plug 117 contained within an electronic ignition system is operated in response to a voltage signal from the output port 124 of the ECM 120, to initiate spark plug firing at a predetermined ignition timing. The intake-valve side electromagnetic actuator 112 is opened in response to a control command signal indicative of a target intake-valve open timing, output from the ECM 120, and closed in response to a control command signal indicative of a target intake-valve closure timing. On the other hand, the exhaust-valve side electromagnetic actuator 115 is opened in response to a control command signal indicative of a target exhaust-valve open timing, output from the ECM 120, and closed in response to a control command signal indicative of a target exhaust-valve closure timing.

Referring now to FIG. 2, there is shown the detailed construction of the electromagnetically-powered intake-valve unit composed of the intake valve 111 and the intake-valve side electromagnetic actuator 112 or the electromagnetically-powered exhaust-valve unit composed of the exhaust valve 114 and the exhaust-valve side electromagnetic actuator 115. In the shown embodiment, the valve construction shown in FIG. 2 is adapted to the electromagnetically-powered exhaust-valve unit as well as the electromagnetically-powered intake-valve unit. Thus, the engine valve 202 shown in FIG. 2 can be regarded as either an intake valve or an exhaust valve. In FIG. 2, reference sign 201 denotes the cylinder head, and reference sign 202 denotes the engine valve. The engine valve 202 is provided slidably with respect to the cylinder head 201. As seen from the cross section shown in FIG. 2, the electromagnetically-powered engine valve unit includes an electromagnetic actuator. The electromagnetic actuator is comprised of at least an axially-movable plunger (consisting of a movable rod 210 in abutted-engagement with the tip end face 202a of the valve stem of the engine valve 202, a movable disc-shaped portion 211 made of soft magnetic substance, fixed to the middle portion of the rod 210 and located between two opposing attracting faces 208b and 209b of magnets 208 and 209), an upper coiled valve spring 215, a lower coiled valve spring 204, and upper and lower electromagnetic coils 209a and 208a, and the upper and lower magnets 209 and 208. The movable plunger rod 210 is slidably fitted into the central axial bores of the magnets 208 and 209, and coaxially arranged with the valve stem of the engine valve portion 202. The engine valve portion 202 is slidably supported on a valve guide (not numbered) in the cylinder head 201. A valve retainer 203 is fixedly connected to the valve stem. The lower valve spring 204 is disposed between the valve retainer 203 and the bottom flattened face of the recessed portion of the cylinder head 201, to permanently bias the movable plunger in a direction closing the port 201a of the cylinder head 201. Reference signs 205, 206, and 207 denote three-split housings in which the two magnets 208 and 209 are accommodated. These housings 205, 206, and 207 are fixedly mounted on the cylinder head 201. The upper electromagnetic coil 209a is disposed in the annular recessed portion formed in the upper magnet 209, while the lower electromagnetic coil 208a is disposed in the annular recessed portion formed in the lower magnet 208. When the electromagnetic coil 208a is excited by means of the driver associated therewith, the lower face 211a of the movable disc-shaped plunger portion 211 is attracted downwards (that is, toward the upper attracting face 208b of the lower magnet 208) against the bias of the lower valve spring 204 by way of an attraction force. Conversely, when the electromagnetic coil 209a is excited by means of the driver associated therewith, the upper face 211b of the movable disc-shaped plunger portion 211 is attracted upwards (that is, toward the lower attracting face 209b of the upper magnet 209) against the bias of the upper valve spring 215 by way of an attraction force. An upper valve-spring seat 214 is fixed to the upper end of the movable plunger rod 210. The upper valve spring 215 is disposed between the upper valve-spring seat 214 and the upper wall portion of a spring cover 216, to permanently bias the movable plunger in a direction opening the port 201a. With the previously-noted arrangement, it is possible to arbitrarily control the opening and closing of the engine valve unit by controlling the activation and deactivation of each of the electromagnetic coils 208a and 209a. A displacement sensor 217 is located at the tip end of the movable plunger rod 210 for monitoring or detecting an axial displacement (or an actual valve lift or an actual valve lifting height) of the rod 210. Usually, the displacement sensor 217 in its simplest form is generally one of a potentiometer (a variable resistor).

Figure 3:
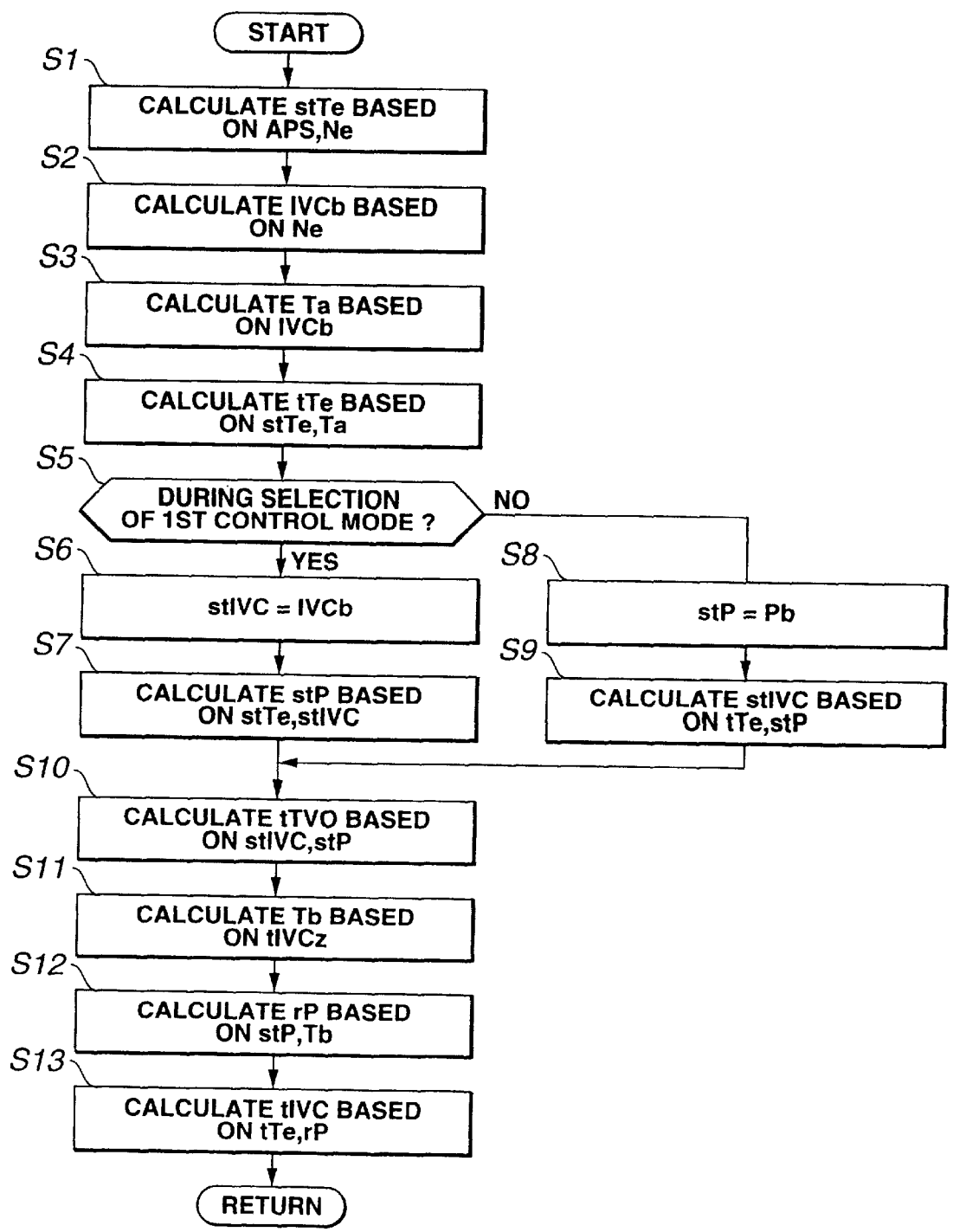
FIG. 3 is a flow chart illustrating an intake-air quantity control program executed by a microprocessor (CPU) incorporated in an electronic control module (ECM) employed in the intake-air quantity control apparatus of the embodiment.

Referring now to FIG. 3, there is shown a first intake-air quantity control program performed by the CPU 122 of the ECM employed in the intake-air quantity control apparatus of the embodiment. As discussed hereunder in reference to the flow chart shown in FIG. 3, the intake-air quantity control apparatus of the embodiment can selectively switch the intake-air quantity control mode between a first control mode in which the intake-air quantity is controlled or managed by adjusting the throttle opening of the throttle valve 105 under a specified condition where the intake-valve closure timing of the intake valve 111 is set to a basic intake-valve closure timing (IVCb), and a second control mode in which the intake-air quantity is controlled or managed by adjusting the intake-valve closure timing under a specified condition where the internal pressure in the intake-air passage 101 (exactly, the internal pressure in the branch passage 108) is set to a basic pressure (Pb). The intake-air quantity control routine of FIG. 3 is based on the assumption that the intake-valve open timing of the intake valve 111 is fixed to a predetermined timing such as TDC (top dead center) on the intake stroke, and the exhaust-valve open timing (EVO) of the exhaust vale 114 and the exhaust-valve closure timing (EVC) are both fixed to predetermined timings. In the first control mode, the internal pressure in the intake-air branch passage 108 drops down to a pressure level lower than atmospheric pressure, thus facilitating or promoting vaporization of fuel injected or sprayed into the intake-air branch passage 108, and also strengthening gas flow within the combustion chamber 110. Therefore, the first control mode is effective to enhance combustion stability of the engine. On the other hand, according to the second control mode, when the basic pressure (Pb) is set at a pressure level substantially corresponding to an atmospheric pressure, it is possible to largely reduce a pumping loss during partial-load operation. This improves fuel economy. In the first control mode, there is a time delay from a time when the throttle opening has been adjusted to a time when an actual change in the quantity of intake air entering the engine occurs, owing to a volumetric capacity from the throttle valve 105 to the intake valve 111. In contrast, in the second control mode, there is no time delay from a time when the intake-valve closure timing of the intake valve 111 has been adjusted to a time when an actual change in the intake-air quantity occurs. The intake-air quantity control routine of FIG. 3 is executed as time-triggered interrupt routines to be triggered every predetermined intervals such as 10 msec.

At step S1, a steady-state target engine torque stTe is calculated or computed on the basis of the engine operating conditions, namely the accelerator opening APS and the engine speed Ne. Concretely, the steady-state target engine torque stTe is map-retrieved from a predetermined or pre-programmed characteristic map showing how the steady-state target engine torque stTe has to be varied relative to the accelerator opening APS and engine speed Ne. The steady-state target engine torque stTe means a steady-state target value onto which the engine torque is converged after a while in the steady state in which both of the accelerator opening APS and the engine speed Ne do not vary. The accelerator opening APS and engine speed Ne used at step S1 are calculated on the basis of the input informational signal data from the engine speed sensor 126 and the crank angle sensor 125, according to another program executed by the CPU 122, and then the calculated values are stored in the RAM of the memories 123.

At step S2, the basic intake-valve closure timing IVCb of the intake valve 111 is calculated on the basis of the engine speed Ne. To be concrete, the basic intake-valve closure timing IVCb is looked up from a predetermined look-up table showing how the basic intake-valve closure timing IVCb has to be varied relative to engine speed Ne. The basic intake-valve closure timing IVCb corresponds to an intake-valve closure timing at which a maximum intake-air charging efficiency is obtained. Basically, the basic intake-valve closure timing IVCb substantially corresponds to a timing near BDC (bottom dead center) on the intake stroke. Generally, when the engine speed Ne increases, there is a tendency for the maximum intake-air charging efficiency point to occur when the intake valve 111 is closed after the piston has passed the BDC. For the reasons discussed above, the basic intake-valve closure timing IVCb is determined or computed depending on the engine speed Ne.

At step S3, a response time constant Ta for the internal pressure in the intake-air passage is calculated on the basis of the basic intake-valve closure timing IVCb. Concretely, the response time constant Ta is looked up from a predetermined look-up table showing how the response time constant Ta has to be varied relative to a basic intake-valve closure timing IVCb. The response time constant Ta is a time constant indicative of a response time delay characteristic or a time-delay characteristic between the start of the throttle-opening adjustment of the throttle valve 105 and the actual change in the internal pressure in the intake-air branch passage 108, under a specified condition where the intake-valve closure timing of the intake valve 111 is set at the basic intake-valve closure timing IVCb. That is, the response time constant Tb based on the basic intake-valve closure timing IVCb indicates a first time constant determining a response delay of a change in the internal pressure in the intake-air passage with respect to a change in the throttle opening. The response time delay characteristic (the response time constant Ta) varies mainly depending on the intake-valve closure timing. The response delay characteristic can be also affected by the engine speed Ne and engine load (that is, an intake-air quantity), as well as the intake-valve closure timing. To enhance the accuracy of arithmetic calculation for the response time constant Ta, the time constant Ta may be retrieved from a preprogrammed map showing how the time constant Ta has to be varied relative to three parameters, namely engine speed Ne, engine load (an intake-air quantity), and a basic intake-valve closure timing (IVCb).

At step S4, a first-order lag processing of the time constant Ta is made to the steady-state target engine torque stTe calculated at step S1, to calculate a target engine torque tTe. A characteristic of changes in the target engine torque tTe calculated as a first-order lag system with the time constant Ta, becomes identical to a characteristic of changes in torque output by the engine when the throttle opening of the throttle valve 105 varies with the intake-valve closure timing of the intake valve 111 kept at the basic intake-valve closure timing IVCb.

At step S5, a check is made to determine whether the control system is operated at the first control mode or at the second control mode. The selecting operation of the control mode itself is performed within the microprocessor (CPU) according to another program different from the main intake-air quantity control program shown in FIG. 3. The CPU 122 is designed to select the first control mode, for instance, when the engine coolant temperature is low and thus the engine does not warm up adequately or when the rotational speed of the engine is greatly fluctuating, and to select the second control mode the other engine operating conditions such as after engine warm-up. When the selected operating mode is the first control mode, the program proceeds from step S5 via step S6 to step S7. Conversely, when the second control mode is selected, the program proceeds from step S5 via step S8 to step S9. At step S6, a steady-state target intake-valve closure timing stIVC is set as the basic intake-valve closure timing IVCb. The steady-state target intake-valve closure timing stIVC corresponds to a steady-state target value of the valve closure timing of the intake valve 111. At step S7, a steady-state target intake-air-passage internal pressure (simply a steady-state target internal pressure) stP is calculated on the basis of both the steady-state target engine torque stTe and the steady-state target intake-valve closure timing stIVC. The steady-state target internal pressure stP (corresponding to a steady-state target value of the internal pressure in the intake-air branch passage 108) means an internal pressure created in the intake-air branch passage 108 when the engine torque will be converged onto the steady-state target engine torque stTe under the specified condition where the intake-valve closure timing of the intake valve 111 is identical to the steady-state intake-valve closure timing stIVC. Details of the arithmetic operations executed at step S7 are described hereunder. These arithmetic operations of step S7 are based on the assumption that the engine torque is obtained by subtracting a torque loss arisen from the pumping loss from an output torque created by burning of the air-fuel mixture in the combustion chamber 110, and additionally the magnitude of the output torque created by burning of the air-fuel mixture within the combustion chamber is determined depending on the quantity of intake air entering the combustion chamber 110. Therefore, the engine torque is represented as a function of the intake-air quantity and the pumping-loss torque as follows.

$$\text{Engine torque} = f(\text{intake-air quantity, pumping-loss torque}) \quad \text{(i)}$$

Where the intake-air quantity is determined depending upon the internal pressure in the intake-air branch passage 108 and an intake-valve opening time period (a time interval between the intake-valve open timing and the intake-valve closure timing). As previously described, in the shown embodiment, of the four timings, namely IVO, IVC, EVO, and EVC, only the intake-valve closure timing (IVC) of the intake valve 111 is variably adjusted, whereas all of the IVO, EVO, and EVC are fixed to predetermined timings. As appreciated, the intake-valve opening time period (the time interval between IVO and IVC) is determined depending upon the intake-valve closure timing of the intake valve 111. Thus, the intake-air quantity is represented as a function of the internal pressure of the intake-air branch passage (simply, the intake-air-passage internal pressure) and the intake-valve closure timing, as follows.

$$\text{Intake-air quantity} = f(\text{intake-air-passage internal pressure, intake-valve closure timing}) \quad \text{(ii)}$$

On the other hand, the pumping-loss torque is determined depending upon the intake-air-passage internal pressure and the intake-air quantity. Therefore, the pumping-loss torque is represented as a function of the intake-air-passage internal pressure and the intake-air quantity, as follows.

$$\text{Pumping-loss torque} = f(\text{intake-air-passage internal pressure, intake-air quantity}) \quad \text{(iii)}$$

As set forth above, the three relational expressions (i), (ii) and (iii), relating to five values, namely the engine torque, intake-air quantity, pumping-loss torque, intake-air-passage internal pressure, intake-valve closure timing, are satisfied. In this case, if two values of these five values are known quantities, it is possible to determine the other three values (unknown quantities), because the number of the relational expressions is three with respect to the three unknown quantities. As discussed above, the steady-state target intake-air-passage internal pressure stP can be computed at step S7, directly by arithmetic operations through which the steady-state target internal pressure stP is calculated by way of the above three relational expressions. Instead of using the arithmetic operations, the results of the arithmetic operations (the pre-calculated values) may be stored in the ROM in the form of a preprogrammed characteristic map data, and thus the steady-state target internal pressure stP may be map-retrieved from the preprogrammed characteristic map data.

In contrast, at step S8 executed only when the second control mode is selected, the steady-state target intake-air-passage internal pressure stP is set at the basic pressure Pb. For the purpose of minimizing the pumping-loss torque, it is effective to set the basic pressure Pb at atmospheric pressure. However, in cars with an evaporative emission control system as one of automotive emission control systems, the evaporative emission control system requires a negative pressure for the previously-described "purging" operation. For the reasons discussed above, in the control system of the embodiment, the basic pressure Pb is actually set at a predetermined pressure level, such as −50 mmHg lower than the atmospheric pressure.

At step S9, the steady-state target intake-valve closure timing stIVC is calculated on the basis of both the target engine torque tTe and the steady-state target intake-air-passage internal pressure stP. More exactly, the steady-state target intake-valve closure timing stIVC is computed as a valve closure timing of the intake valve 111 given when the engine output torque will be converged onto the steady-state target engine torque stTe under the specified condition where the internal pressure in the intake-air branch passage 108 is identical to the steady-state intake-air-passage internal pressure stP. The arithmetic operation of step S9 is based on the previously-noted three relational expressions.

At step S10, a target throttle opening tTVO of the throttle valve 105 is calculated on the basis of both the steady-state target intake-valve closure timing stIVC and the steady-state target intake-air-passage internal pressure stP. Generally, the relationship among the intake-air-passage internal pressure, the intake-valve closure timing, and the throttle opening is specified in the steady state of the engine. Based on the specified relationship among them, the target throttle opening tTVO of the throttle valve 105 can be computed. The ECM 120 generates a target throttle-opening indicative signal representative of the target throttle opening tTVO. Then, the target throttle-opening indicative signal is output via the output port 124 to the throttle actuator 106.

At step S11, a response time constant Tb for the intake-air-passage internal pressure on the basis of a previous value tIVCz of a target intake-valve closure timing of the intake valve 111. Concretely, the response time constant Tb is looked up from a preprogrammed look-up table showing how the response time constant Tb has to be varied relative to a target intake-valve closure timing tIVC (exactly, a previous target intake-valve closure timing tIVCz). The response time constant Tb based on the target intake-valve closure timing tIVC indicates a second time constant determining a response delay of a change in the internal pressure in the intake-air passage with respect to a change in the throttle opening.

At step S12, a first-order lag processing of the time constant Tb is made to the steady-state target intake-air-passage internal pressure stP (calculated at step S7 or at step S8), so as to calculate or estimate a real intake-air-passage internal pressure rP. The real internal pressure rP estimated is regarded as an actual internal pressure in the intake-air branch passage 108, and substantially corresponds to the actual internal pressure in the intake-air branch passage 108. If the pressure sensor 129 screwed into the collector 107 has a satisfactory response characteristic and an adequate accuracy of pressure-measurement, the sensor signal from the pressure sensor 129 may be used instead of the internal pressure rP estimated. The use of the sensor signal from the pressure sensor 129 eliminates the necessity of steps S11 and S12.

At step S13, the target intake-valve closure timing tIVC is calculated on the basis of the target engine torque tTe and the real intake-air-passage internal pressure rP estimated or sensed. The arithmetic operation of step S13 is also based on the previously-noted three relational expressions. The ECM 120 generates a target intake-valve closure timing indicative signal representative of the target intake-valve closure timing tIVC. Then, the target intake-valve closure timing indicative signal is sent via the output port 124 to the intake-valve side electromagnetic actuator 112.

Referring now to FIGS. 4A–4E, there are shown variations in the accelerator opening APS, the engine torque (steady-state target engine torque stTe, target engine torque tTe), the internal pressure in the intake-air branch passage (steady-state target intake-air-passage internal pressure stP, real intake-air-passage internal pressure rP estimated or sensed), the intake-valve closure timing (steady-state target intake-valve closure timing stIVC, target intake-valve closure timing tIVC), and the throttle opening (target throttle opening tTVO), obtained when the system operating mode is switched from first to second control mode during execution of the main control program shown in FIG. 3.

In the time charts shown in FIGS. 4A–4E, the steady-state is maintained until the time t0, and thus the steady-state target engine torque stTe is identical to the target engine torque tTe, the steady-state target intake-air-passage internal pressure stP is identical to the real intake-air-passage internal pressure rP estimated or sensed, and the steady-state target intake-valve closure timing stIVC is identical to the target intake-valve closure timing tIVC. The intake-valve closure timing of the intake valve 111 is held at the basic intake-valve closure timing IVCb, since the system is operated at the first control mode until the time t0. When the accelerator opening APS increases rapidly at the time t0, the steady-state target engine torque stTe rises rapidly owing to the rapid rise in the accelerator opening APS. By contrary, the target engine torque tTe is calculated as a value asymptotic to the steady-state target engine torque stTe with a first-order lag (related to step S4 of FIG. 3). At this time, the time constant is equal to the response time constant Ta for the internal pressure in the intake-air passage (see steps S3 and S4 of FIG. 3). Between t0 and t1, the system operating mode is not yet changed and remains in the first control mode, and thus the steady-state target valve-closure timing stIVC is still kept at the basic intake-valve closure timing IVCb. As appreciated from step S7 of FIG. 3, the steady-state intake-air-passage internal pressure stP is calculated based on both the steady-state target intake-valve closure timing stIVC and the rapidly-risen steady-state target engine torque stTe, and therefore the steady-state target intake-air-passage internal pressure stP rapidly rises at the time to (see FIG. 4C). For the same reason as previously described, the target throttle opening tTVO, calculated based on both the steady-state target intake-valve closure timing stIVC and the rapidly-risen steady-state target intake-air-passage internal pressure stP, rapidly rises at the time t0 (see FIG. 4E). The real intake-air-passage internal pressure rP is estimated or calculated as a value asymptotic to the steady-state target intake-air-passage internal pressure stP with a first-order lag (related to step S12 of FIG. 3). At this time, the time constant is equal to the response time constant Tb for the internal pressure in the intake-air passage (see steps S11 and S12 of FIG. 3). When the target throttle opening tTVO rapidly increases at the time t0, the actual throttle opening of the throttle valve 105 is brought closer to the target throttle opening tTVO. At this time, in accordance with the rapid increase in the actual throttle opening of the throttle valve 105, the internal pressure in the intake-air branch passage 108 begins to gradually rise, and also the real intake-air-passage internal pressure rP estimated or calculated is nearly equal to an actual internal pressure in the intake-air branch passage 108. As seen in step S13 of FIG. 3, the target intake-valve closure timing tIVC is constantly calculated based on both the target engine torque tTe and the real intake-air-passage internal pressure rP. As appreciated from a series of steps S1–S7 and S10–S13 (particularly, steps S1–S4 needed to compute the target engine torque tTe) executed during the first control mode, the target intake-valve closure timing tIVC is not forcibly set at the basic intake-valve closure timing IVCb, but as a consequence the target intake-valve closure timing tIVC is maintained at a timing substantially corresponding to the basic intake-valve closure timing IVCb. When the system operating mode is switched from the first control mode to the second control mode at the time t1, the steady-state target intake-air-passage internal pressure stP is rapidly set equal to the basic pressure Pb (for example −50 mmHg). As seen in step S9 of FIG. 3, the steady-state target intake-valve closure timing stIVC is calculated based on both the steady-state target intake-air-passage internal pressure stP rapidly set at the basic pressure Pb and the target engine torque tTe gradually increasing. As a result, the steady-state target valve-closure timing stIVC rapidly momentarily advances at the time t1, and thereafter gradually moderately changes in a direction retarding the valve-closure timing. Owing to the change in the steady-state target intake-valve closure timing stIVC, the target throttle opening tTVO rapidly increases at the time t1, and thereafter gradually moderately changes in a direction further increasing the throttle opening. On the other hand, the real intake-air-passage internal pressure rP is estimated or calculated as a value asymptotic to the steady-state target intake-air-passage internal pressure stP (further increasing in a stepwise manner) with a first-order lag. After switching from first to second control mode at t1, the real intake-air-passage internal pressure rP estimated or calculated becomes almost equal to an actual internal pressure in the intake-air branch passage 108. At this time, the real intake-air-passage internal pressure rP changes with a characteristic entirely different from that of the target engine torque tTe. However, the target intake-valve closure timing tIVC, based on both the target engine torque tTe and the real intake-air-passage internal pressure rP, gradually advances, and therefore the engine output torque (engine power output) matches with the target engine torque tTe.

On the other hand, FIGS. 5A–5E, show variations in the accelerator opening APS, the engine torque (steady-state target engine torque stTe, target engine torque tTe), the internal pressure in the intake-air branch passage (steady-state target intake-air-passage internal pressure stP, real intake-air-passage internal pressure rP estimated or sensed), the intake-valve closure timing (steady-state target intake-valve closure timing stIVC, target intake-valve closure timing tIVC), and the throttle opening (target throttle opening tTVO), obtained when the system operating mode is switched from second to first control mode during execution of the main control program shown in FIG. 3.

In the time charts shown in FIGS. 5A–5E, the steady-state is maintained until the time t4, and thus the steady-state target engine torque stTe is identical to the target engine torque tTe, the steady-state target intake-air-passage internal pressure stP is identical to the real intake-air-passage internal pressure rP estimated or sensed, and the steady-state target intake-valve closure timing stIVC is identical to the target intake-valve closure timing tIVC. The internal pressure in the intake-air branch passage 108 has already been set equal to the basic pressure Pb, since the system is still operated at the second control mode. Between t4 and t5, the system remains in the second control mode, and thus the steady-state target intake-air-passage internal pressure stP remains held at the basic pressure Pb. As seen in step S9 of FIG. 3, the steady-state target intake-valve closure timing stIVC is calculated based on both the steady-state target intake-air-passage internal pressure stP set at the basic pressure Pb and the gradually-increasing target engine torque tTe, and thus from t4 the steady-state target intake-valve closure timing stIVC gradually changes in a direction retarding the valve closure timing. In the same manner, the target throttle opening tTVO, calculated on the basis of both the steady-state target intake-air-passage internal pressure stP and the gradually-increasing (gradually-retarding) steady-state target intake-valve closure timing stIVC, gradually increases from the time t4. Within the time interval between t4 and t5, the real intake-air-passage internal pressure rP remains unchanged (that is, remains kept at the basic pressure Pb). As can be appreciated from comparison between steps S9 and S13, the steady-state target intake-valve closure timing stIVC itself is thus calculated as the target intake-valve closure timing tIVC. When the system operating mode is switched from second to first control mode at the time t5, the steady-state target intake-valve closure timing stIVC is rapidly set equal to the basic intake-valve closure timing IVCb. After switching to the first control mode at t5, the steady-state target intake-air-passage internal pressure stP is calculated on the basis of both the steady-state target intake-valve closure timing stIVC and the steady-state target engine torque stTe (see the flow from step S5 via step S6 to step S7), and therefore the steady-state target intake-air-passage internal pressure stP rapidly drops at the time t5, owing to the rapid drop in the steady-state target intake-valve closure timing stIVC. Owing to such a rapid drop in the steady-state target intake-air-passage internal pressure stP, the target throttle opening tTVO rapidly reduces at the time t5. The real intake-air-passage internal pressure rP is calculated as a value asymptotic to the steady-state target intake-air-passage internal pressure stP (falling rapidly at t5) with a first-order lag. At this time, the real intake-air-passage internal pressure estimated becomes nearly equal to an actual internal pressure in the intake-air branch passage 108. After the time t5, the target intake-valve closure timing tIVC, based on both the target engine torque tTe and the real intake-air-passage internal pressure rP, gradually retards, and as a result the engine output torque (engine power output) matches with the target engine torque tTe.

As discussed above, when the system is operating in the first control mode, the intake-valve closure timing of the intake valve 111 is adjusted to the basic intake-valve closure timing IVCb except just after switching from the second control mode to the first control mode, and thus the intake-air quantity (that is, the engine output torque) is controlled by adjusting the throttle opening of the throttle valve 105. Conversely, when the system is operating in the second control mode, the internal pressure in the intake-air branch passage 108 is regulated to the basic pressure Pb except just after switching from the first control mode to the second control mode, and thus the intake-air quantity is controlled by adjusting the intake-valve closure timing of the intake valve 111. According to the air-quantity control routine shown in FIG. 3, the engine output torque constantly matches with the target engine torque tTe. The switching operation between first and second control modes can be smoothly achieved without any engine-torque difference during switching between the first and second control modes (without any rapid change in engine output torque before and after the time t1 during switching to the second control mode and without any rapid change in engine output torque before and after the time t5 during switching to the first control mode). The time charts shown in FIGS. 4A–4E and 5A–5E are exemplified in a particular case wherein the switching operation between first and second control modes occurs in a transient state of the engine, that is, with a rapid increase in the accelerator opening APS. As a matter of course, according to the intake-air quantity control apparatus of the embodiment, there is no rapid change in engine output torque even when switching between first and second control modes in a steady state.

Figure 6:
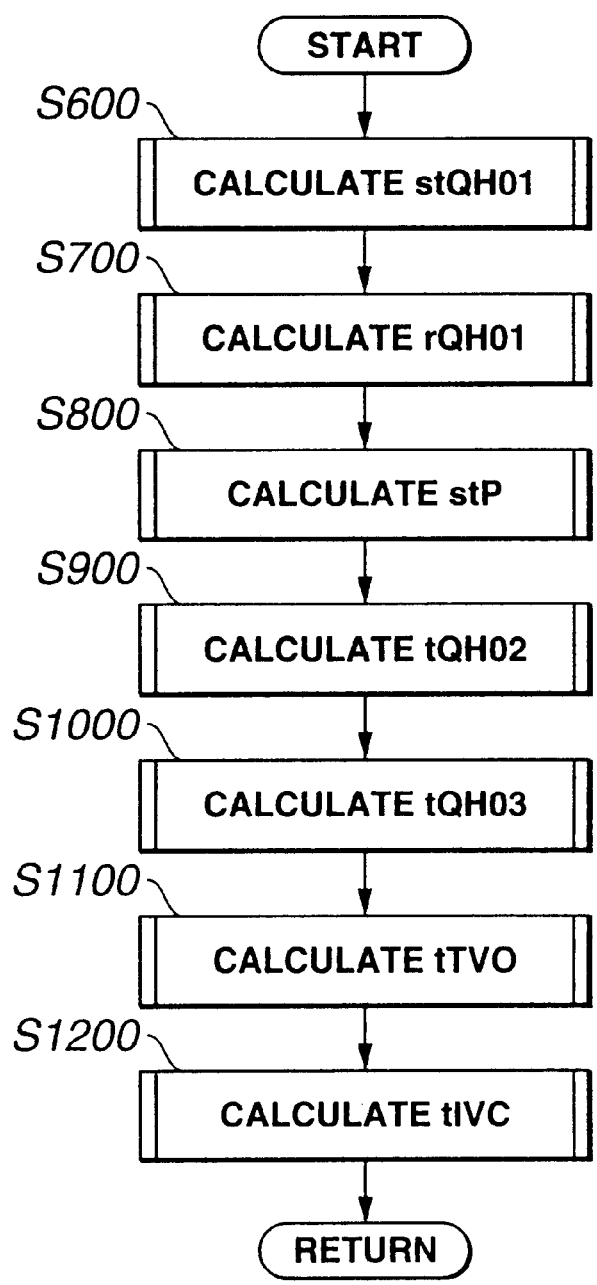
FIG. 6 is a flow chart illustrating another main control program (another intake-air quantity control routine), executable by the CPU of the ECM of the intake-air quantity control apparatus of the embodiment.

Referring now to FIG. 6, there is shown another intake-air quantity control program executed by the CPU 122 of the ECM 120 of the intake-air quantity control apparatus of the embodiment. The main routine shown in FIG. 6 is executed as time-triggered interrupt routines to be triggered every predetermined intervals such as 10 msec. At step S600, a steady-state target intake-air quantity stQH01 is calculated. At step S700, a real intake-air quantity rQH01 is calculated. At step S800, a steady-state target intake-air-passage internal pressure stP is calculated. At step S900, a target intake-air quantity tQH02 is calculated. At step S1000, a mode-switching period target intake-air quantity tQH03 needed during mode switching of the intake-air quantity control mode (that is, during switching between first and second control modes), is calculated. At step S1100, a target throttle opening tTVO is calculated. At step S1200, a target intake-valve closure timing tIVC is calculated.

Details of a series of steps S600–S1200 of FIG. 6 are hereinbelow described in detail in reference to the corresponding subroutines (see FIGS. 7, 10, 11, 12, 13, 14 and 18).

Figure 7:
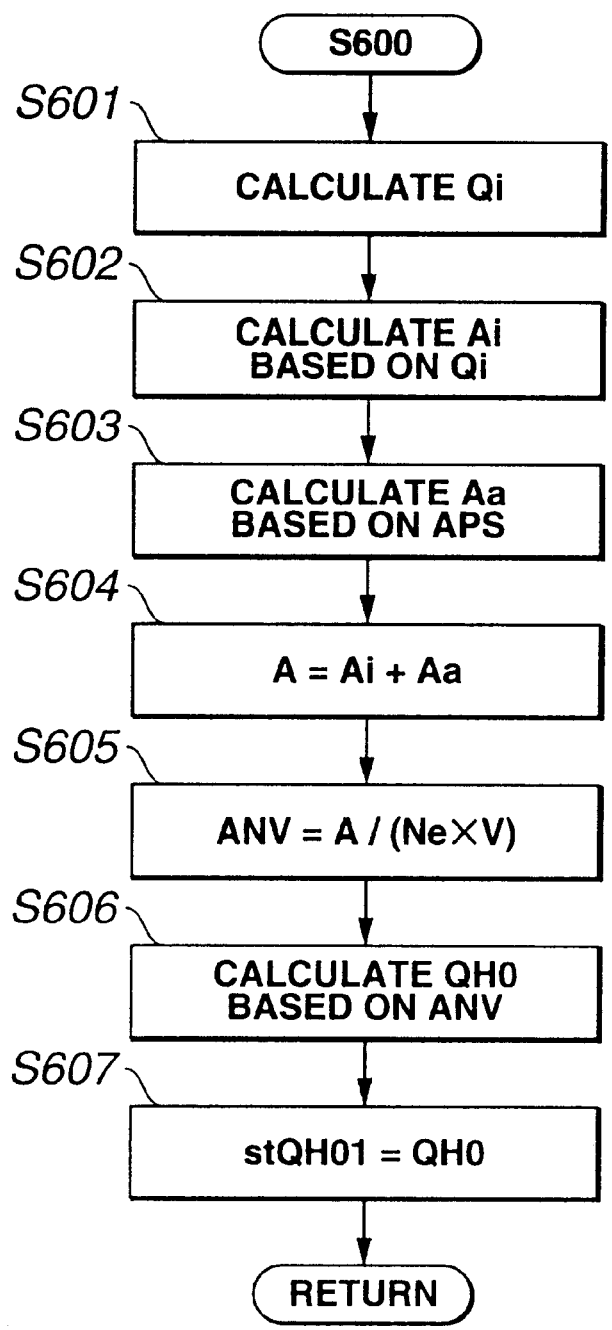
FIG. 7 is a flow chart illustrating a subroutine executed at step S600 of FIG. 6.
Figure 8:
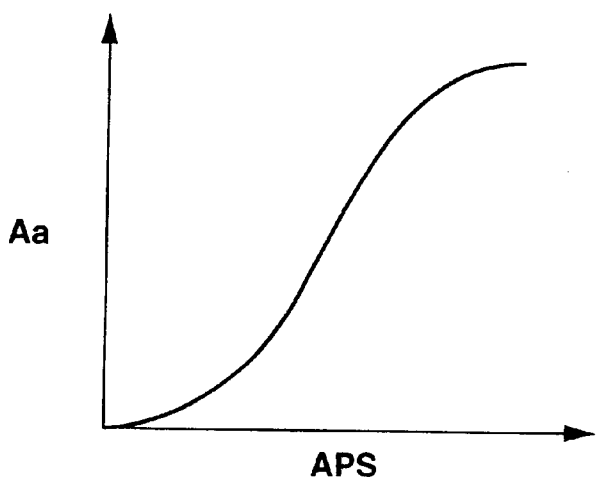
FIG. 8 is a characteristic map showing the relationship between a throttle opening area Aa corresponding to the driver-required engine power output and an accelerator opening or accelerator operating amount APS.
Figure 9:
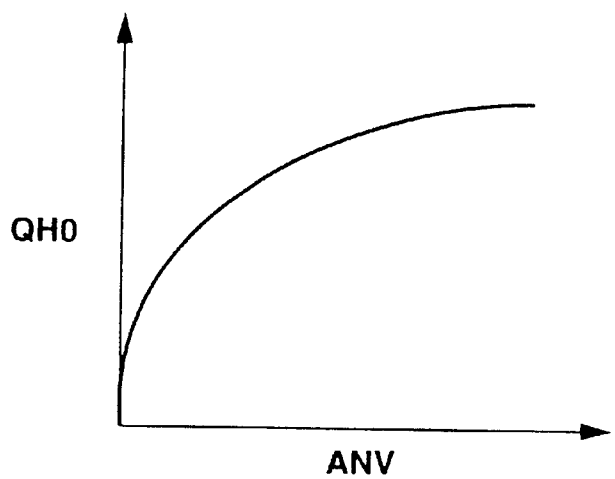
FIG. 9 is a characteristic map showing the relationship between a volumetric flow rate QH0 and a parameter ANV.

Referring to FIG. 7, the steady-state target intake-air quantity (stQH01) calculation subroutine is entered at point S600 and proceeds to step S601. At step S601, an idle-holding intake-air quantity Qi is calculated. The idle-holding intake-air quantity Qi means a sum of an intake-air quantity needed to hold the engine speed Ne at a preset idle speed and an additional intake-air quantity needed to produce engine torque corresponding to engine-accessories loads such as an air conditioner. At step S602, an idle-holding throttle opening area or an idle-stabilization throttle opening area Ai is calculated on the basis of the idle-holding intake-air quantity Qi. Concretely, the idle-holding throttle opening area Ai is calculated by multiplying the idle-holding intake-air quantity Qi with a coefficient representative of the relationship between and the throttle opening area and the a flow rate of air passing through the throttle valve 105 in sonic flow. The coefficient can be retrieved on the basis of the idle-holding intake-air quantity Qi from a predetermined or preprogrammed characteristic map showing how the throttle opening area Ai has to be varied relative to a flow rate of air passing through the throttle valve in sonic flow. At step S603, an equivalent throttle opening area Aa corresponding to a driver-required engine power output is calculated on the basis of the latest up-to-date accelerator opening indicative data APS. Concretely, the equivalent throttle opening area Aa is retrieved from a predetermined look-up table or a preprogrammed accelerator-opening (APS)/equivalent throttle-opening (Aa) conversion map shown in FIG. 8. At step S604, a total throttle opening area (simply, a throttle opening area) A (=Ai+Aa) is calculated by adding the idle-holding throttle opening area Ai to the equivalent throttle opening area Aa. At step S605, a variable parameter ANV is arithmetically calculated by an expression ANV= A/(Ne×V), where A denotes a total throttle opening area (simply, a throttle opening area), Ne denotes engine speed, and V denotes a displacement of the engine. At step S606, a volumetric flow rate QHO (indicating a volume of intake air in a standard condition (atmospheric temperature and pressure) with respect to a stroke volume of the engine) is calculated on the basis of the parameter ANV. Concretely, the volumetric flow rate QHO is retrieved from a predetermined look-up table or a preprogrammed variable parameter (ANV)/volumetric flow rate (QHO) conversion map stored in the computer memory and shown in FIG. 9. In the shown embodiment, the ANV/QHO conversion map shown in FIG. 9 is preprogrammed on the assumption that the intake-valve open timing (IVO) of the intake valve 111 is set at T.D.C. (top dead center), whereas the intake-valve closure timing (IVC) is set at B.D.C. (bottom dead center). The volumetric flow rate QHO is used as the desired intake-air quantity. At step S607, a steady-state target intake-air quantity stQH01 is set to the volumetric flow rate QHO. The steady-state intake-air quantity stQH01 means a steady-state target value onto which the intake-air quantity is converged after a while in the steady state, when the first control mode is selected.

Figure 10:
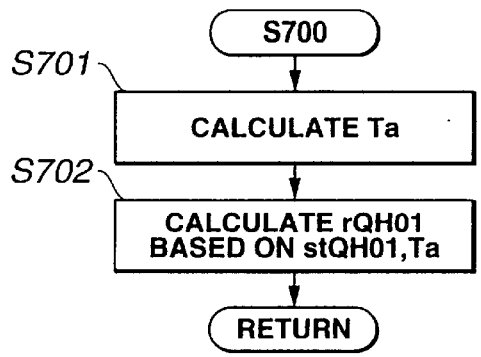
FIG. 10 is a flow chart illustrating a subroutine executed at step S700 of FIG. 6.

Referring to FIG. 10, the real intake-air quantity (rQH01) calculation subroutine is entered at point S700 and proceeds to step S701. At step S701, in the same manner as step S3 of the routine shown in FIG. 3, the response time constant Ta for the internal pressure in the intake-air passage is calculated or looked up from a predetermined look-up table showing how the response time constant Ta has to be varied relative to a basic intake-valve closure timing IVCb. At step S702, a first-order lag processing of the time constant Ta is made to the steady-state target intake-air quantity stQH01 calculated at step S607, to calculate a real intake-air quantity rQH01. The real intake-air quantity rQH01 obtained by the first-order lag processing, is a value representative of an actual intake-air quantity during operation at the first control mode.

Figure 11:
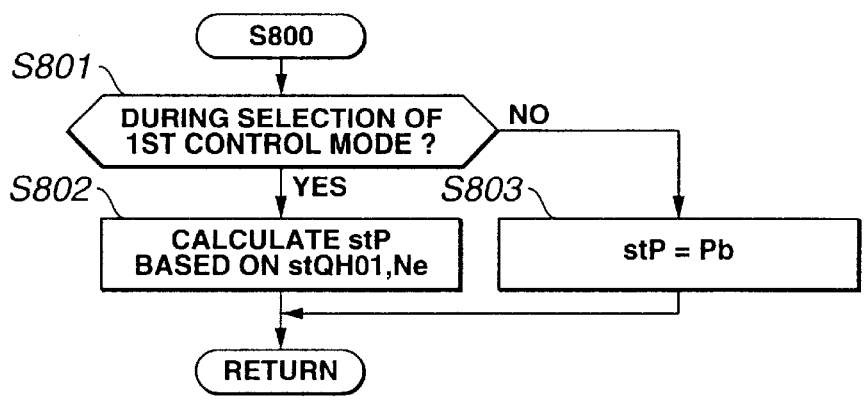
FIG. 11 is a flow chart illustrating a subroutine executed at step S800 of FIG. 6.

Referring to FIG. 11, the steady-state target intake-air-passage internal pressure (stP) calculation subroutine is entered at point S800 and proceeds to step S801. At step S801, a check is made to determine whether the first control mode is selected. When the answer to step S801 is in the affirmative (YES), that is, the first control mode is selected, step S802 occurs. At step S802, the steady-state target intake-air-passage internal pressure stP is estimated or calculated on the basis of both the steady-state target intake-air quantity stQH01 and the engine speed Ne. Concretely, the steady-state target intake-air-passage internal pressure stP is looked up or retrieved from a preprogrammed characteristic map showing how the steady-state target intake-air-passage internal pressure stP has to be varied relative to a steady-state target intake-air quantity stQH01 and engine speed Ne. The steady-state target intake-air-passage internal pressure stP is a value indicative of a steady-state target value of the internal pressure in the intake-air branch passage 108. Conversely, when the answer to step S801 is in the negative (NO), that is, the second control mode is selected, step S803 occurs. At step S803, the steady-state target intake-air-passage internal pressure stP is set equal to the basic pressure Pb such as −50 mmHg. In the system of the shown embodiment, the basic pressure Pb is preset at a comparatively high pressure level such as −50 mmHg. Preferably, the basic pressure Pb may be determined depending on engine temperature, for example engine coolant temperature.

Figure 12:
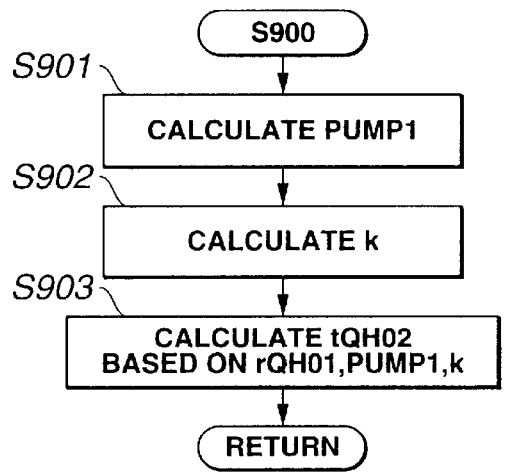
FIG. 12 is a flow chart illustrating a subroutine executed at step S900 of FIG. 6.

Referring to FIG. 12, the target intake-air quantity (tQH02) calculation subroutine is entered at point S900 and proceeds to step S901. At step S901, a pumping-loss difference correction factor PUMP1, needed to compensate for the pumping-loss difference between a pumping loss created during the first control mode and a pumping loss created during the second control mode, is calculated. Actually, the pumping-loss difference correction factor PUMP1 is looked up or map-retrieved from a predetermined characteristic map. At step S902, a combustion efficiency difference correction factor k, needed to compensate for the combustion-efficiency difference between a combustion efficiency obtained during the first control mode and a combustion efficiency obtained during the second control mode, is calculated. The combustion-efficiency difference correction factor k is looked up or map-retrieved from a preprogrammed characteristic map. In determining the previously-noted characteristic map for the pumping-loss difference correction factor PUMP1 and in determining the previously-noted characteristic map for the combustion-efficiency difference correction factor k, such an intake-air quantity as to produce the same engine output torque both at the first and second control modes is experimentally measured by the inventors of the present invention, and then a rate of change in the previously-noted intake-air quantity is plotted at any engine torque. Each of the characteristic maps for PUMP1 and k is preprogrammed based on the rate-of-change data. At step S903, the real intake-air quantity rQH01 is compensated or corrected by both the pumping-loss difference correction factor PUMP1 and the combustion-efficiency difference correction factor k, so as to calculate compensated intake-air quantity, that is, the target intake-air quantity tQH02. The target intake-air quantity tQH02 corresponds to a target value or a desired value of an intake-air quantity when the selected system operating mode is the second control mode. During operation at the second control mode, it is possible to produce engine output torque equal to a torque value of engine output torque created during operation at the first control mode by matching the intake-air quantity with the target intake-air quantity tQH02. Additionally, it is possible to match a torque response to an accelerator operating amount (APS) obtained in the first control mode system with a torque response to an accelerator operating amount (APS) obtained in the second control mode system by matching the intake-air quantity with the target intake-air quantity tQH02.

Figure 13:
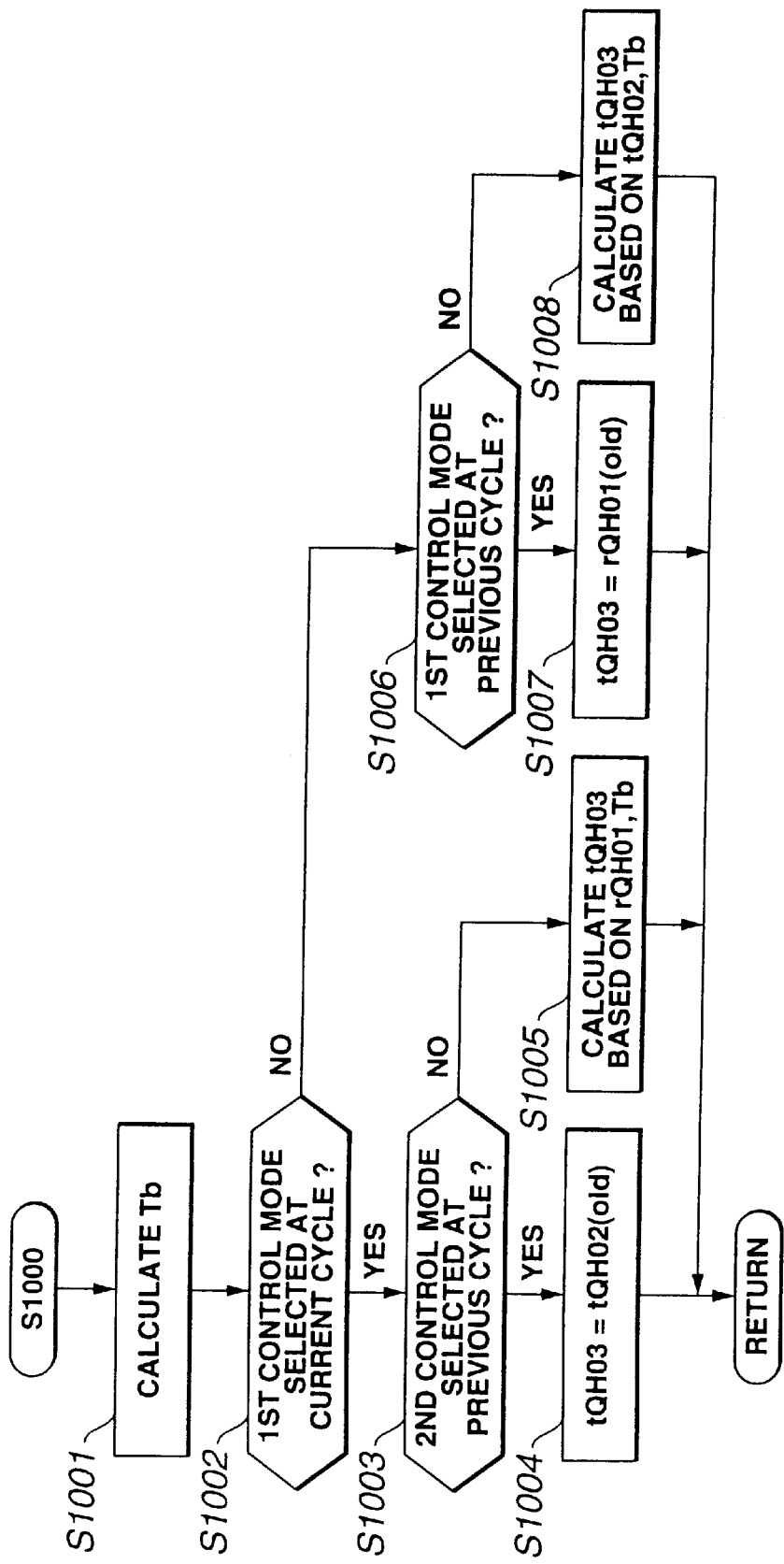
FIG. 13 is a flow chart illustrating a subroutine executed at step S1000 of FIG. 6.

Referring to FIG. 13, the mode-switching period target intake-air quantity (tQH03) calculation subroutine is entered at point S1000 and proceeds to step S1001. At step S1001, in the same manner as step S11 of the routine shown in FIG. 3, the response time constant Tb for the intake-air-passage internal pressure is calculated or looked up from a predetermined look-up table showing how the response time constant Tb has to be varied relative to a previous value tIVCz of a target intake-valve closure timing of the intake valve 111. Art step S1002, a test is made to determine whether the first control mode is selected at the current cycle. When the answer to step S1002 is affirmative (YES), step S1003 occurs. At step S1003, a test is made to determine whether the second control mode is selected at the previous cycle. When the answers to both steps S1002 and S1003 are affirmative (YES), that is, switching from the second control mode to the first control mode occurs, the subroutine proceeds to step S1004. At step S1004, the mode-switching period target intake-air quantity tQH03 needed during switching from second to first control mode, is set at the previous value tQH02$_{(old)}$ of the target intake-air quantity tQH02 (corresponding to a desired intake-air quantity needed during the second control mode). That is to say, when switching from second to first control mode occurs, the target intake-air quantity tQH02 calculated just before initiation of the switching operation to first control mode is set at an initial value of the target intake-air quantity tQH03. Returning to steps S1002 and S1003, when the answer to step S1002 is affirmative (YES) and the answer to step S1003 is negative (NO), that is, the first control mode is continuously selected, step S1005 occurs. At step S1005, a first-order lag processing of the response time constant Tb is made to the real intake-air quantity rQH01 to compute the target intake-air quantity tQH03, so that the mode-switching period target intake-air quantity tQH03 approaches the real intake-air quantity rQH01 with a time lag defined by the response time constant Tb. Thus, just after switching to the first control mode, the target intake-air quantity tQH03 is first set equal to the previous value tQH02$_{(old)}$ of the target intake-air quantity tQH02, and thereafter brought closer to the real intake-air quantity rQH01 with the time lag defined by the response time constant Tb. When the answer to step S1002 is negative, step S1006 occurs. At step S1006, a check is made to determine whether the first control mode is selected at the previous cycle. When the answer to step S1002 is negative (NO) and the answer to step S1006 is affirmative (YES), that is, switching from first to second control mode occurs, the subroutine proceeds from step S1006 to step S1007. At step S1007, the mode-switching period target intake-air quantity tQH03 needed during switching from first to second control mode, is set at the previous value rQH01$_{(old)}$ of the real intake-air quantity rQH01 (corresponding to a value representative of an actual intake-air quantity during the first control mode). That is to say, when switching from first to second control mode occurs, the real intake-air quantity rQH01 calculated just before initiation of the switching operation to second control mode is set at an initial value of the mode-switching period target intake-air quantity tQH03. Conversely, when the answer to step S1002 is negative (NO) and the answer to step S1006 is negative (NO), that is, the second control mode is continuously selected, step S1008 occurs. At step S1008, a first-order lag processing of the response time constant Tb is made to the target intake-air quantity tQH02 to compute the intake-air quantity tQH03, so that the target intake-air quantity tQH03 approaches the target intake-air quantity tQH02 with a time lag defined by the response time constant Tb. Thus, just after switching to the second control mode, the target intake-air quantity tQH03 is first set equal to the previous value rQH01$_{(old)}$ of the real intake-air quantity rQH01, and thereafter brought closer to the target intake-air quantity tQH02 with the time lag defined by the response time constant Tb.

Figure 14:
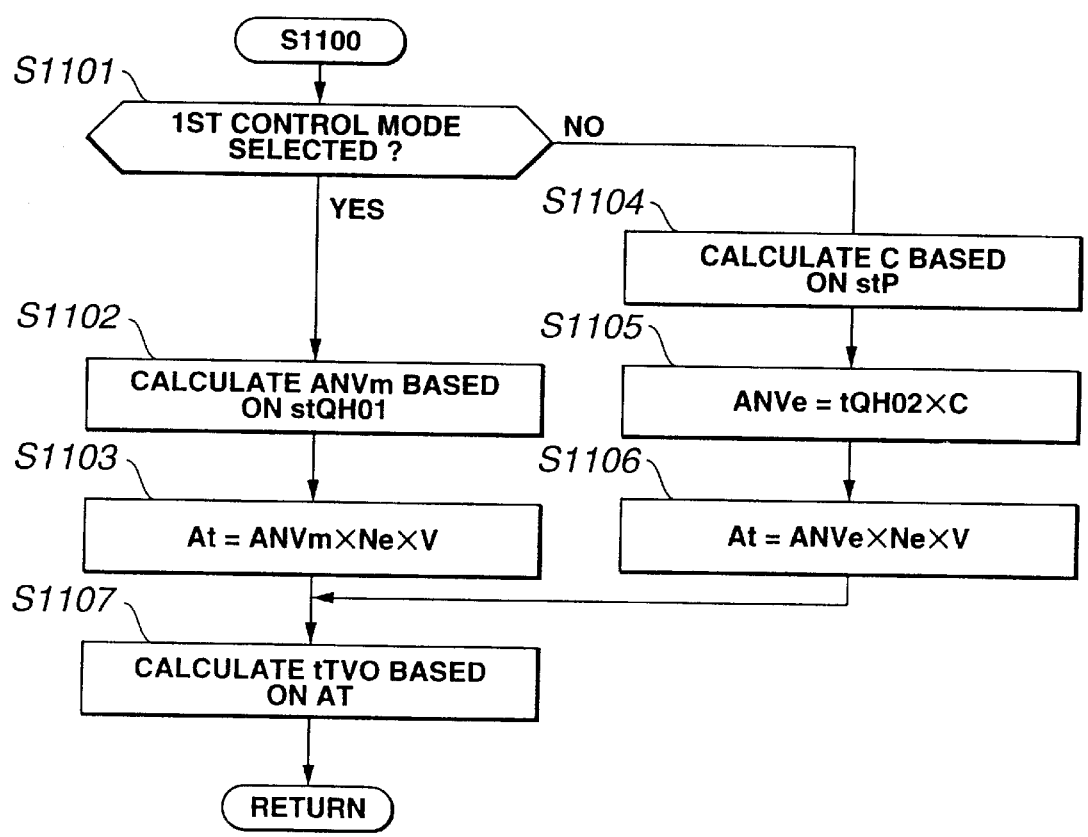
FIG. 14 is a flow chart illustrating a subroutine executed at step S1100 of FIG. 6.
Figure 15:
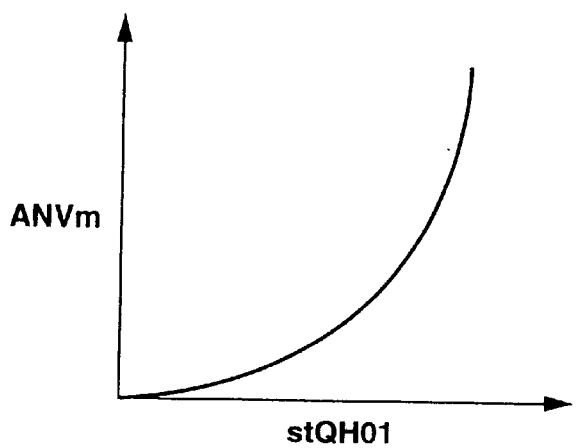
FIG. 15 is a characteristic map showing the relationship between a steady-state target intake-air quantity stQH01 and a parameter ANVm.
Figure 16:
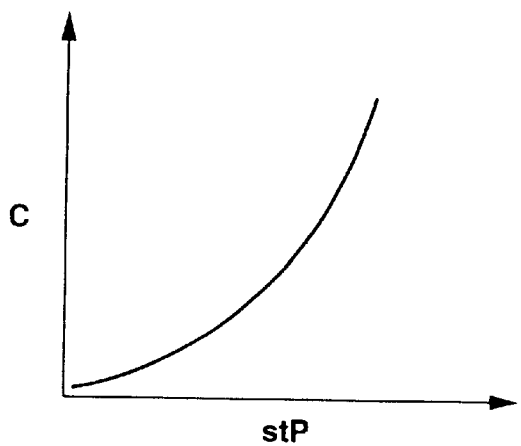
FIG. 16 is a characteristic map showing the relationship between a coefficient C and a steady-state target internal pressure stP.
Figure 17:
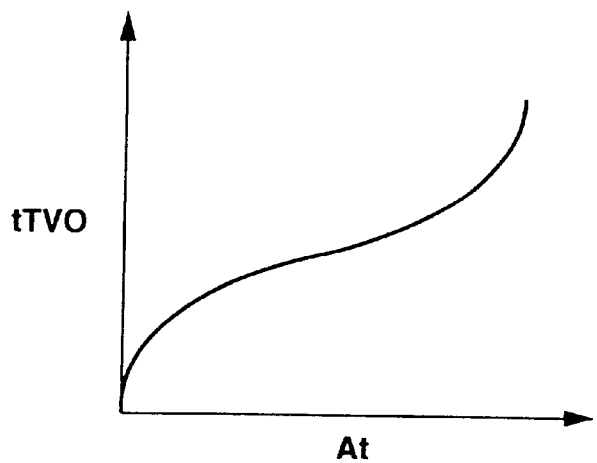

Referring to FIG. 14, the target throttle opening (tTVO) calculation subroutine is entered at point S1100 and proceeds to step S1101. At step S1101, a check is made to determine whether the first control mode is selected. When the answer to step S1101 is in the affirmative (YES), the subroutine flows from step S1101 through steps S1102 and S1103 to step S1107. Conversely, when the answer to step S1102 is in the negative (NO), the subroutine proceeds from step S1102 through steps S1104, S1105, S1106 to step S1107. At step S1102, a variable parameter ANVm is calculated on the basis of the steady-state target intake-air quantity stQH01. Concretely, the parameter ANVm is looked up or map-retrieved from a preprogrammed ANVm-stQH01 characteristic map shown in FIG. 15. The parameter ANVm is arithmetically calculated as a value obtained by an expression ANVm=At/(Ne×V), where At denotes the throttle opening area in case that the intake-valve closure timing is set according to the first control mode, Ne denotes engine speed, and V denotes a displacement of the engine. At step S1103, the throttle opening area At is calculated by multiplying the parameter ANVm with both the engine speed Ne and the displacement V of the engine. At step S1104, a coefficient C is calculated on the basis of the steady-state target intake-air-passage internal pressure stP. Concretely, the coefficient C is looked up or map-retrieved from a preprogrammed characteristic map showing how the coefficient C has to be varied relative to a steady-state target intake-air-passage internal pressure stP (see FIG. 16 showing an example of the C-stP characteristic map). On the assumption that the internal pressure in the intake-air passage is constant, a value At/(Ne×V) obtained by dividing the throttle opening area At by both the engine speed Ne and the displacement V of the engine, is in proportion to a volumetric flow rate (QHO). In this case, a proportional coefficient between the value At/(Ne×V) and the volumetric flow rate (QHO) corresponds to the coefficient C. The steady-state target intake-air-passage internal pressure stP used at step S1104 corresponds to the steady-state target intake-air-passage internal pressure stP (set at step S803 of FIG. 11 and set equal to the basic pressure Pb such as −50 mmHg). At step S1105, a parameter ANVe is calculated by multiplying the target intake-air quantity tQH02 by the coefficient C. The parameter ANVe is arithmetically calculated as a value obtained by an expression ANVe=At/(Ne×V), where At denotes the throttle opening area based on the second control mode, Ne denotes engine speed, and V denotes a displacement of the engine. At step S1106, the throttle opening area At based on the second control mode is calculated by multiplying the parameter ANVe with both the engine speed Ne and the displacement V of the engine. At step S1107, a target throttle opening tTVO is calculated on the basis of the throttle opening area At calculated at step S1103 or at step S1106. Concretely, the target throttle opening tTVO is looked up or retrieved from a preprogrammed tTVO-At characteristic map shown in FIG. 17.

Figure 18:
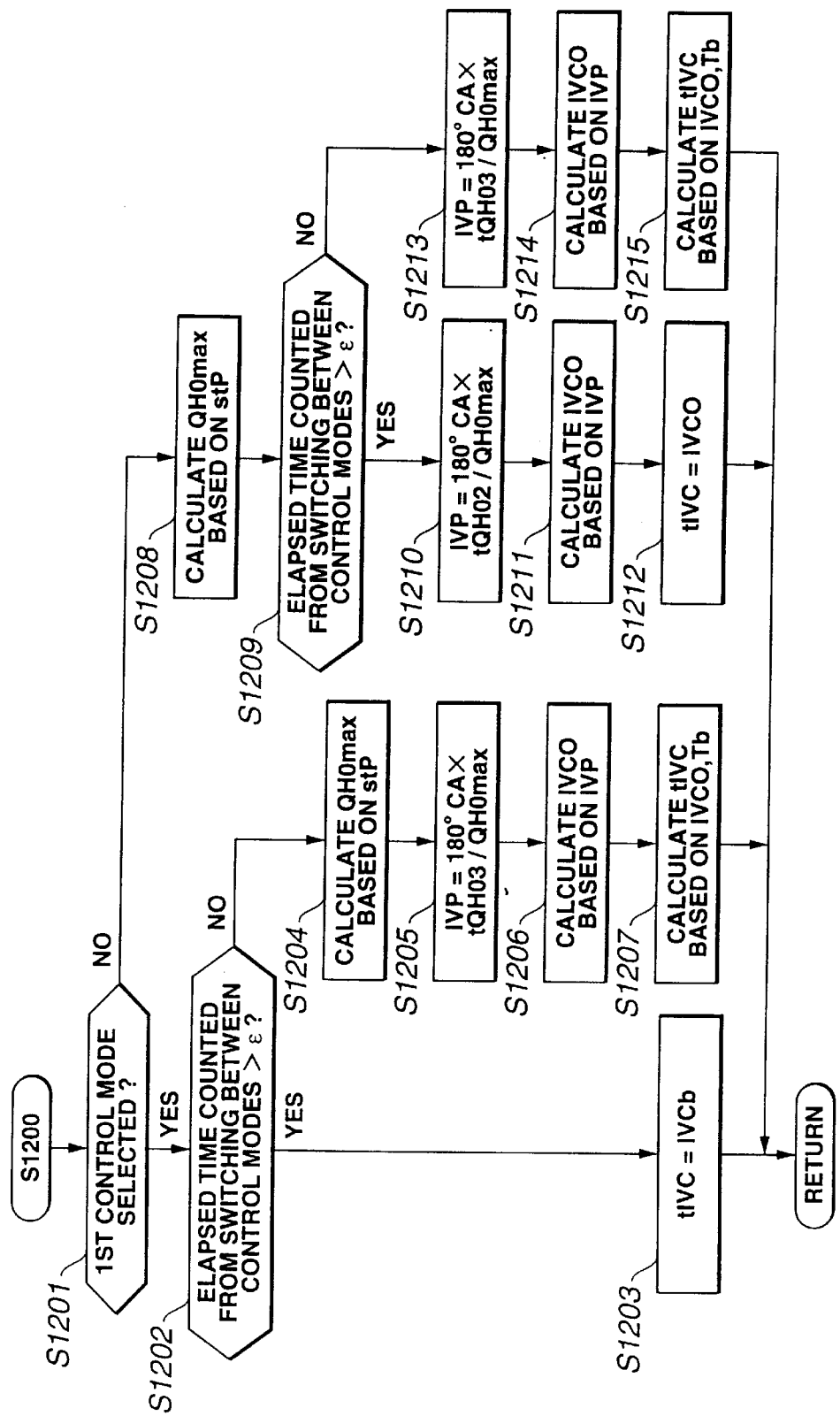
FIG. 18 is a flow chart illustrating a subroutine executed at step S1200 of FIG. 6.

Referring to FIG. 18, the target intake-valve closure timing (tIVC) calculation subroutine is entered at point S1200 and proceeds to step S1201. At step S1201, a check is made to determine whether the first control mode is selected. When the answer to step S1201 is in the affirmative (YES), the subroutine proceeds from step S1201 to step S1202. At step S1202, a check is made to determine whether an elapsed time counted from switching between control modes exceeds a predetermined time interval $\epsilon$. When the answer to step S1202 is affirmative (YES), that is, in case of the elapsed time>$\epsilon$, the subroutine advances to step S1203. At step S1203, the target intake-valve closure timing tIVC is set equal to a basic intake-valve closure timing IVCb. Conversely, when the answer to step S1202 is negative (NO), that is, in case of the elapsed time$\leq\epsilon$, step S1204 occurs. At step S1204, a maximum intake-air quantity QH0max is calculated on the basis of the steady-state target intake-air-passage internal pressure stP. Concretely, the maximum intake-air quantity QH0max is looked up or map-retrieved from a preprogrammed QH0 max-stP characteristic map shown in FIG. 19. The maximum intake-air quantity means a maximum air quantity of intake air drawn into the engine under a particular condition where the internal pressure in the intake-air branch passage 108 is identical to the steady-state target intake-air-passage internal pressure stP. The steady-state target intake-air-passage internal pressure stP used at step S1204 corresponds to the steady-state target intake-air-passage internal pressure stP (calculated at step S802 of FIG. 11 and based on both the engine speed Ne and the steady-state target intake-air quantity stQH01). At step S1205, an intake-valve opening time period IVP (a time interval between intake-valve open timing (IVO) and intake-valve closure timing (IVC)) is calculated by multiplying a crank angle of 180 degrees from T.D.C. (top dead center) to B.D.C. (bottom dead center) by a ratio (tQH03/QH0max) of the target intake-air quantity tQH03 needed during switching between control modes to the maximum intake-air quantity QH0max. That is, the intake-valve opening time period IVP is represented by an expression IVP=180° crank angle ×(tQH03/QH0max). At step S1206, a dummy intake-valve closure timing or a temporary intake-valve closure timing IVC0 of the intake valve 111 is calculated on the basis of the intake-valve opening time period IVP calculated at step S1205. The temporary intake-valve closure timing IVC0 obtained through step S1206 corresponds to such an intake-valve closure timing that the intake-air quantity becomes the mode-switching period target intake-air quantity tQH03 under a particular condition where the internal pressure in the intake-air branch passage 108 is identical to the estimated or calculated steady-state target intake-air-passage internal pressure stP (based on both the engine speed Ne and the steady-state target intake-air quantity stQH01). At step S1207, a first-order lag processing of the response time constant Tb is made to the temporary intake-valve closure timing IVC0 to compute the target intake-valve closure timing tIVC. As a result of such a first-order lag processing of the time constant Tb made to the temporary intake-valve closure timing IVC0, it is possible to match the actual intake-air quantity with mode-switching period the target intake-air quantity tQH03. When the answer to step S1201 is in the negative (NO), that is, the first control mode is not selected, the subroutine advances to step S1208. In a similar manner as step S1204, at step S1208 the maximum intake-air quantity QH0max is calculated on the basis of the steady-state target intake-air-passage internal pressure stP. The parameter stP used at step S1208 corresponds to the steady-state target intake-air-passage internal pressure stP (=the basic pressure Pb such as −50 mmHg) set at step S803 of FIG. 11. Thereafter, at step S1209, a check is made to determine whether an elapsed time counted from switching between control modes exceeds a predetermined time interval $\epsilon$, in a similar manner as step S1202. When the answer to step S1209 is affirmative (YES), that is, in case of the elapsed time>$\epsilon$, step S1210 occurs. At step S1210, an intake-valve opening time period IVP (=180° crank angle× (tQH02/QH0max)) is calculated by multiplying a crank angle of 180 degrees from T.D.C. (top dead center) to B.D.C. (bottom dead center) by a ratio (tQH02/QH0max) of the target intake-air quantity tQH02 needed during the second control mode to the maximum intake-air quantity QH0max. At step S1211, the temporary intake-valve closure timing IVC0 is calculated on the basis of the intake-valve opening time period IVP calculated at step S1210. The temporary intake-valve closure timing IVC0 obtained through step S1211 corresponds to such an intake-valve closure timing that the intake-air quantity becomes the target intake-air quantity tQH02 under a particular condition where the internal pressure in the intake-air branch passage 108 is adjusted to the steady-state target intake-air-passage internal pressure stP (set at Pb). At step S1212, the temporary intake-valve closure timing IVC0 itself is set as the target intake-valve closure timing tIVC. Conversely, when the answer to step S1209 is negative (NO), that is, the elapsed time counted from switching between control modes does not exceed the predetermined time interval $\epsilon$, the subroutine proceeds from step S1209 to step S1213. In the same manner as step S1205, at step S1213 the intake-valve opening time period IVP is calculated by multiplying a crank angle of 180 degrees from T.D.C. to B.D.C. by a ratio (tQH03/QH0max) of the target intake-air quantity tQH03 needed during switching between control modes to the maximum intake-air quantity QH0max. In the same manner as step S1206, at step S1214 the temporary intake-valve closure timing IVC0 is calculated on the basis of the intake-valve opening time period IVP calculated at step S1213. In the same manner as step S1207, at step S1215 a first-order lag processing of the response time constant Tb is made to the temporary intake-valve closure timing IVC0 obtained through step S1214 to compute the target intake-valve closure timing tIVC.

Referring now to FIGS. 20A–20E, there are shown variations in the accelerator opening APS, the intake-air quantity (steady-state target intake-air quantity stQH01, real intake-air quantity rQH01, target intake-air quantity tQH02 needed during the second control mode, mode-switching period target intake-air quantity tQH03 needed during switching between first and second control modes), the internal pressure in the intake-air passage (steady-state intake-air-passage internal pressure stP, actual internal pressure in the intake-air passage), the intake-valve closure timing (temporary intake-valve closure timing IVC0, target intake-valve closure timing tIVC), and the throttle opening (target throttle opening tTVO), obtained when the system operating mode is switched from first to second control mode during execution of the intake-air quantity control program of FIG. 6. On the other hand, FIGS. 21A–21E show variations in the parameters APS, stQH01, rQH01, tQH02, tQH03, stP, IVC0, tIVC, tTVO, and the actual intake-air-passage internal pressure, obtained when the system operating mode is switched from second to first control mode during execution of the intake-air quantity control program of FIG. 6.

In the time charts shown in FIGS. 20A–20E, when the accelerator opening APS increases rapidly at the time t0 during the first control mode (see the rising edge of the accelerator-opening indicative voltage signal wave shown in FIG. 20A at t0). Owing to the rapid rise in the accelerator opening APS, the steady-state target intake-air quantity stQH01 also increases rapidly (see FIG. 20B), but the quantity of intake air actually drawn into the engine follows with a slight time delay (see a moderate ascending curve of the real intake-air quantity rQH01 of FIG. 20B after t0). Owing to the rapid increase in the steady-state target intake-air quantity stQH01 just after t0, the target throttle opening tTVO also increases rapidly (see the rising edge of the target throttle-opening indicative signal wave shown in FIG. 20E at t0). At this time, the target intake-air quantity tQH02 increases depending on the increase in the real intake-air quantity rQH01, however the asymptotic line of the target intake-air quantity tQH02 is positioned at a lower level than the steady-state target intake-air quantity stQH01 (compare the uppermost line indicative of the change in the parameter stQH01 with the lowermost characteristic curve indicative of the change in the parameter tQH02 in FIG. 20B). This is because there is a difference in the intake-air quantity required to hold the engine output torque constant during switching from first to second control mode. Thereafter, when predetermined conditions needed to switch from first to second control mode is satisfied at the time t1, switching from first to second control mode occurs or initiates. Upon initiation of the mode switching from first to second control mode, first, the target intake-air quantity tQH03 needed during mode switching of the intake-air quantity control is computed so that its initial value is set at the real intake-air quantity rQH01$_{(old)}$ calculated just before the mode switching point t1. Then, the computed value of the mode-switching period target intake-air quantity tQH03 varies in accordance with the intake-air-passage internal pressure changing characteristic having the response time constant Tb, so that the computed value of the target intake-air quantity tQH03 gradually approaches the target intake-air quantity tQH02 needed during the second control mode (see the intersection between changing characteristics of the two parameters rQH01 and tQH03 on the time t1, and compare the changing characteristic of the mode-switching period target intake-air quantity tQH03 with the changing characteristic of the actual intake-air-passage internal pressure estimated as the real intake-air-passage internal pressure rP or sensed directly by the pressure sensor after t1 in FIGS. 20B and 20C). Additionally, the target intake-valve closure timing tIVC is computed in accordance with the intake-air-passage internal pressure changing characteristic of the response time constant Tb (see FIGS. 20C and 20D between t1 and t2). That is to say, immediately before the mode switching point t1 in FIGS. 20A–20E, the target intake-valve closure timing tIVC is set at the basic intake-valve closure timing IVCb (see the flow from step S1201 via step S1202 to step S1203 in FIG. 18). As soon as switching to the second control mode occurs at t1, the target intake-valve closure timing tIVC begins to approach the temporary intake-valve closure timing IVC0 (see the flow from step S1201 through steps S1208, S1209, S1213 and S1214 to step S1215 in FIG. 18) and see the characteristic curve of the target intake-valve closure timing tIVC indicated by the solid line and the characteristic curve of the temporary intake-valve closure timing IVC0 indicated by the broken line between t1 and t2 in FIG. 20D). After the time t2, the target intake-valve closure timing tIVC is maintained at the temporary intake-valve closure timing IVC0 calculated (see the flow from S1209 through steps S1210 and S1211 to step S1212 in FIG. 18). On the other hand, as seen in FIGS. 21A–21E, when the system operating mode is switched from second to first control mode at the time t5, first of all, the target intake-air quantity tQH03 needed during mode switching of the intake-air quantity control is computed so that its initial value is set at the target intake-air quantity tQH02$_{(old)}$ calculated just before the mode switching point t5. Then, the computed value of the target intake-air quantity tQH03 varies in accordance with the intake-air-passage internal pressure changing characteristic having the response time constant Tb, so that the computed value of the target intake-air quantity tQH03 gradually approaches the real intake-air quantity rQH01 needed during the first control mode (see the intersection between changing characteristics of the two parameters tQH02 and tQH03 on the time t5, and compare the changing characteristic of the mode-switching period target intake-air quantity tQH03 with the changing characteristic of the actual intake-air-passage internal pressure estimated as the real intake-air-passage internal pressure rP or sensed directly by the pressure sensor after t5 in FIGS. 21B and 21C). Additionally, the target intake-valve closure timing tIVC is computed in accordance with the intake-air-passage internal pressure changing characteristic of the response time constant Tb (see FIGS. 21C and 21D between t5 and t6). From the beginning of switching to the second control mode, that is, from the mode switching point t5, the target intake-valve closure timing tIVC begins to approach the temporary intake-valve closure timing IVC0 (see the flow from step S1201 through steps S1202, S1204, S1205 and S1206 to step S1207 in FIG. 18) and see the characteristic curve of the target intake-valve closure timing tIVC indicated by the solid line and the characteristic curve of the temporary intake-valve closure timing IVC0 indicated by the broken line between t5 and t6 in FIG. 21D). After the time t6, the target intake-valve closure timing tIVC is kept at the basic intake-valve closure timing IVCb (see the flow from S1202 to step S1203 in FIG. 18). On the other hand, the target throttle opening tTVO varies in accordance with the changing characteristic of the target intake-air quantity tQH02 during the time period between t4 and t5, that is, during the second control mode (see the flow from step S1101 through steps S1102 and S1103 to step S1107), and varies in accordance with the changing characteristic of the steady-state target intake-air quantity stQH01 from t5 that is, after switching to the first mode (see the flow from step S1101 through steps S1104 and S1105 to step S1106).

Figure 19:
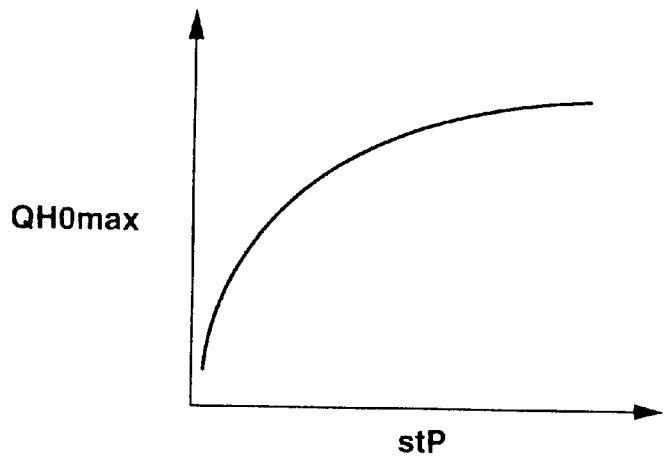
FIG. 19 is a characteristic map showing the relationship between a maximum intake-air quantity QH0max and the steady-state target internal pressure stP.
Figure 22:
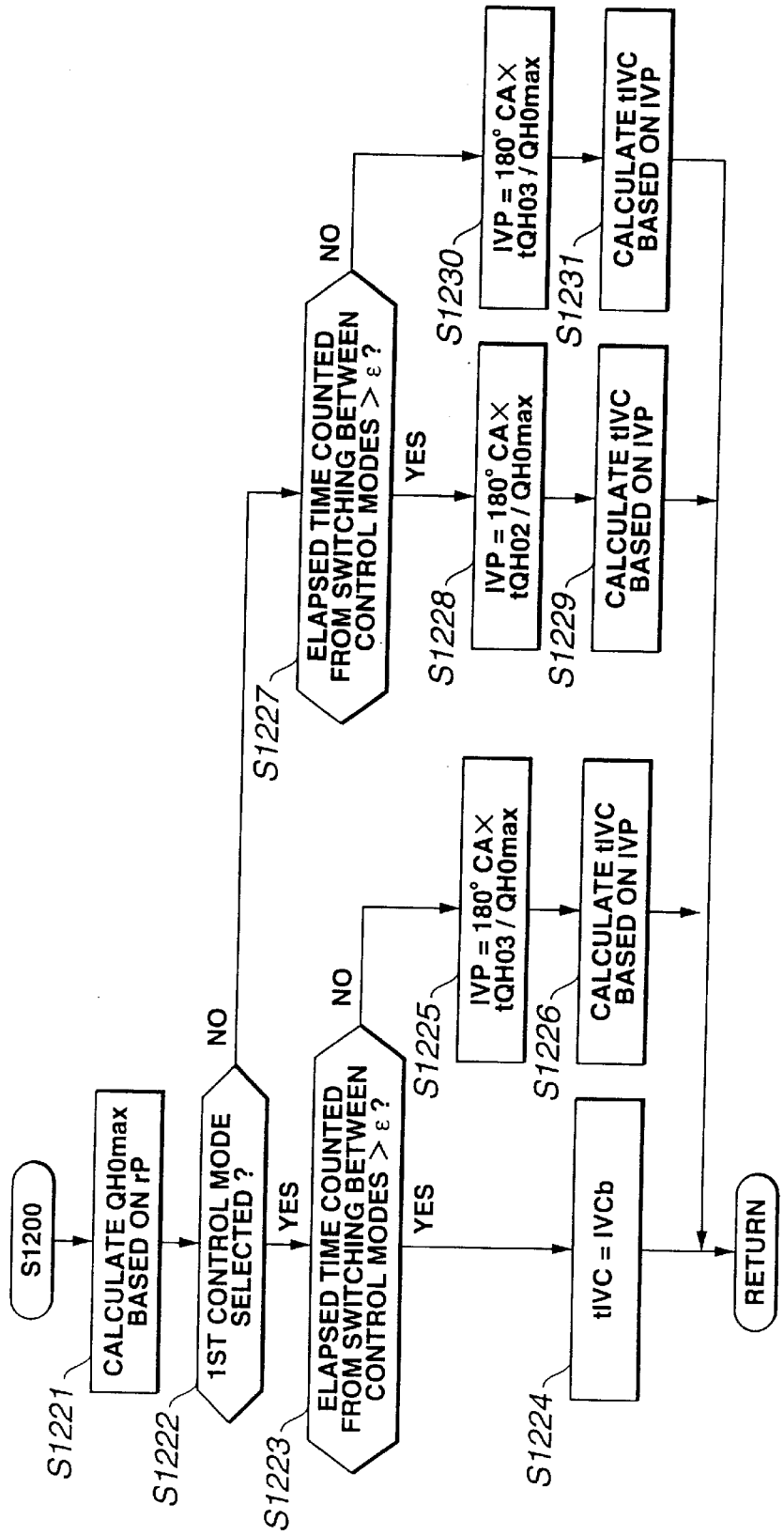
FIG. 22 is a flow chart illustrating another subroutine executed at step S1200 of FIG. 6 instead of the subroutine of FIG. 18.

Referring now to FIG. 22, there is shown another arithmetic-calculation subroutine for the target intake-valve closure timing tIVC. In order to arithmetically calculate the target intake-valve closure timing tIVC, the IVC arithmetic routine shown in FIG. 18 uses the steady-state target intake-air quantity stQH01 calculated through the subroutine (steps S801–S803) of FIG. 11, whereas the tIVC arithmetic routine shown in FIG. 22 uses the real intake-air quantity rP actually sensed by the pressure sensor 129. The control system can use the program shown in FIG. 22, only when the pressure sensor 129 has a satisfactory response characteristic and an adequate accuracy of pressure-measurement. At step S1221, the real intake-air-passage internal pressure rP derived from the sensor signal from the pressure sensor 129 is read, and then a maximum intake-air quantity QH0max is calculated or retrieved on the basis of the real intake-air-passage internal pressure rP. In the shown embodiment, the same preprogrammed characteristic map as shown in FIG. 19 can be used as a characteristic map showing how the maximum intake-air quantity QH0max has to be varied relative to the real intake-air-passage internal pressure rP. In case that the maximum intake-air quantity is calculated or retrieved on the basis of the real intake-air-passage internal pressure rP, the maximum intake-air quantity QH0max is equivalent to a value indicative of a maximum possible quantity of intake air actually drawn into the engine. At step S1222, a check is made to determine whether the first control mode is selected. When the first control mode is selected, step S1223 occurs. At step S1223, a check is made to determine whether an elapsed time counted from switching between control modes exceeds a predetermined time interval $\epsilon$. In case of the elapsed time>$\epsilon$, the subroutine proceeds from step S1223 to step S1224. At step S1224, the target intake-valve closure timing tIVC is set at the basic intake-valve closure timing IVCb. The flow from step S1221 through steps S1222 and S1223 to step S1224 in FIG. 22 occurs when the switching operation to first control mode has already been completed and thus the system is operating at the first control mode, and substantially corresponds to the flow from step S1201 via step S1202 to step S1203 in FIG. 18 and corresponds to the range from t6 in the time chart shown in FIG. 21D. When the answer to step S1223 is negative, the subroutine flows from step S1223 via step S1225 to step S1226. In the same manner as step S1205, at step S1225 an intake-valve opening time period IVP (a time interval between IVO and IVC) is calculated by an expression IVP=180° crank angle× (tQH03/QH0max). At step S1226, the target intake-valve closure timing tIVC is calculated on the basis of the intake-valve opening time period IVP calculated at step S1225. In this manner, according to the subroutine of FIG. 22, the target intake-valve closure timing tIVC can be calculated directly on the basis of the intake-valve opening time period IVP, without calculating a temporary intake-valve closure timing IVC0 as set forth above. The flow from step S1223 via step S1225 to step S1226 in FIG. 22 occurs for a brief moment from the time when switching from second to first control mode initiates, and substantially corresponds to the flow from step S1202 through steps S1204, S1205, and S1206 to step S1207 in FIG. 18 and corresponds to the range between t5 and t6 in the time chart shown in FIG. 21D. When the answer to step S1222 is negative, the subroutine advances to step S1227. At step S1227, a check is made to determine whether an elapsed time counted from switching between control modes exceeds the predetermined time interval $\epsilon$. When the answer to step S1227 is affirmative, step S1228 occurs. In the same manner as step S1210 of FIG. 18, at step S1228 an intake-valve opening time period IVP (=180° crank angle×(tQH02/QH0max)) is calculated by multiplying a crank angle of 180 degrees from T.D.C. to B.D.C. by a ratio tQH02/QH0max. Then, at step S1229, the target intake-valve closure timing tIVC is calculated on the basis of the intake-valve opening time period IVP calculated at step S1228. The flow from step S1222 through steps S1227 and S1228 to step S1229 in FIG. 22 occurs when the switching operation to second control mode has already been completed and thus the system is operating at the second control mode, and substantially corresponds to the flow from step S1201 through steps S1208, S1209, S1210, and S1211 to step S1212 in FIG. 18 and corresponds to the range from t2 in the time chart shown in FIG. 20D. On the other hand, when the answer to step S1227 is negative, step S1230 occurs. In the same manner as step S1225, at step S1230 an intake-valve opening time period IVP (=180° crank angle×(tQH03/QH0max)) is calculated by multiplying a crank angle of 180 degrees from T.D.C. to B.D.C. by a ratio tQH03/QH0max. Thereafter, at step S1231, the target intake-valve closure timing tIVC is calculated on the basis of the intake-valve opening time period IVP calculated at step S1230. The flow from step S1227 via step S1230 to step S1231 in FIG. 22 occurs for a brief moment from the time when switching from first to second control mode initiates, and substantially corresponds to the flow from step S1209 through steps S1213 and S1214 to step S1215 in FIG. 18 and corresponds to the range between t1 and t2 in the time chart shown in FIG. 20D.

As will be appreciated from the above, according to the intake-air control apparatus of the invention, it is possible to provide equalized or balanced engine torque characteristics with respect to an operation of the engine's manipulator (an equalized torque response to an operation of the engine's manipulator and an equalized magnitude of engine output torque with respect to an operating amount of the engine's manipulator), irrespective of whether the selected intake-air quantity control mode is the first control mode or the second control mode. Additionally, it is possible to switch between the first and second control modes without any engine-torque difference. Furthermore, in the apparatus of the invention, the basic intake-valve closure timing IVCb is set at an intake-valve closure timing at which a maximum charging efficiency of intake air entering the engine is obtained, and therefore it is possible to effectively increase the engine output torque when the first control mode is selected. Also, the basic pressure Pb is set at a pressure level substantially corresponding to an atmospheric pressure, and thus it is possible to largely lower a fuel consumption rate measured during the second control mode in comparison with that measured during the first control mode. Moreover, in the apparatus of the invention, a first-order lag processing of the first response time constant Ta based on the basic intake-valve closure timing IVCb is made to the steady-state target engine torque stTe, and thus it is possible to provide an equalized torque response to an operation of the engine's manipulator by way of a comparatively simple arithmetic operation, irrespective of the selected control mode. Also, a first-order lag processing of the second response time constant Tb based on the target intake-valve closure timing tIVC is made to the steady-state target intake-air-passage internal pressure stP, and thus it is possible to attain an equalized magnitude of engine output torque with respect to an operating amount of the engine's manipulator by way of a comparatively simple arithmetic operation, irrespective of the selected control mode. The apparatus of the invention may use a sensor signal from a pressure sensor having a high measurement accuracy and a high sensing response for measurement of an internal pressure in the intake-air passage. In this case, a high-accuracy pressure sensor is required, however, it is possible to more simplify the arithmetic operation needed to provide an equalized magnitude of engine output torque with respect to an operating amount of the engine's manipulator by way of a comparatively simple arithmetic operation. Furthermore, according to the apparatus of the invention, a first-order lag processing of the first response time constant Ta is made to the steady-state target intake-air quantity stQH01, and additionally the target intake-air quantity tQH02 is calculated by compensating for the real intake-air quantity rQH01 utilizing a pumping-loss difference correction factor PUMP1, thus enhancing the accuracy of the intake-air quantity control. Similarly, a first-order lag processing of the first response time constant Ta is made to the steady-state target intake-air quantity stQH01, and additionally the target intake-air quantity tQH02 is calculated by compensating for the real intake-air quantity rQH01 utilizing a combustion-efficiency difference correction factor k, thus enhancing the accuracy of the intake-air quantity control. Also, the apparatus of the invention calculates and uses the mode-switching period target intake-air quantity tQH03 needed during switching between control modes. The use of the mode-switching period target intake-air quantity is effective to enable a smooth switching operation between the first and second control modes without any engine torque difference. Moreover, when switching from first to second control mode, the mode-switching period target intake-air quantity tQH03 is calculated by making a first-order lag processing of the second response time constant Tb based on the target intake-valve closure timing tIVC to the real intake-air quantity rQH01 calculated just before switching to the second control mode and the target intake-air quantity tQH02 calculated after switching to the second control mode. Conversely, when switching from second to first control mode, the mode-switching period target intake-air quantity tQH03 is calculated by making a first-order lag processing of the second response time constant Tb to the target intake-air quantity tQH02 calculated just before switching to the first control mode and the real intake-air quantity rQH01 calculated after switching to the first control mode. Such arithmetic operations are comparatively simple, but contributes to the avoidance of engine-torque difference when the system operating mode is switched from first to second control mode or vice versa. Also, the apparatus of the invention calculates the temporary intake-valve closure timing IVC0 based on both the mode-switching period target intake-air quantity tQH03 and the steady-state target intake-air-passage internal pressure stP, and the target intake-valve closure timing tIVC needed during switching between the first and second control modes is calculated by making a first-order lag processing of the second response time constant Tb to the temporary intake-valve closure timing IVC0 when switching between the first and second control modes occurs. Such arithmetic operations are comparatively simple, but provides the same effects (the avoidance of engine-torque difference during switching between the first and second control modes) as discussed above.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake-air quantity control apparatus for an internal combustion engine with a variable valve timing system comprising:
   a throttle valve disposed in an intake-air passage of the engine and controlled so that a throttle opening of said throttle valve is brought closer to a target throttle opening (tTVO);
   an intake valve disposed between the intake-air passage and a combustion chamber of the engine and controlled so that an intake-valve closure timing of said intake valve is brought close to a target intake-valve closure timing (tIVC); and
   a microprocessor programmed to perform the following:
   (a) selecting one of a first control mode in which an intake-air quantity of the engine is controlled by adjusting the throttle opening of said throttle valve, and a second control mode in which an intake-air quantity of the engine is controlled by adjusting the intake-valve closure timing of said intake valve;
   (b) calculating a steady-state target engine torque (stTe) based on operating conditions (APS, Ne) of the engine, the steady-state target engine torque (stTe) indicating a steady-state target value of engine torque;
   (c) calculating a target engine torque (tTe) based on the steady-state target engine torque (stTe), the target engine torque (tTe) following the steady-state target engine torque (stTe) with a predetermined time delay;
   (d) setting a steady-state target intake-valve closure timing (stIVC) at a basic intake-valve closure timing (IVCb) when the first control mode is selected, the steady-state target intake-valve closure timing (stIVC) indicating a steady-state target value of the intake-valve closure timing;
   (e) calculating a steady-state target intake-air-passage internal pressure (stP) based on both the steady-state target engine torque (stTe) and the steady-state target intake-valve closure timing (stIVC) when the first control mode is selected, the steady-state target intake-air-passage internal pressure (stP) indicating a steady-state target value of an internal pressure in the intake-air passage;
   (f) setting the steady-state target intake-air-passage internal pressure (stP) at a basic pressure (Pb) when the second control mode is selected;
   (g) calculating the steady-state target intake-valve closure timing (stIVC) based on both the target engine torque (tTe) and the steady-state target intake-air-passage internal pressure (stP) when the second control mode is selected;
   (h) obtaining a real intake-air-passage internal pressure (rP), the real intake-air-passage internal pressure (rP) indicating an actual internal pressure in the intake-air passage;
   (i) calculating the target throttle opening (tTVO) based on both the steady-state target intake-valve closure timing (stIVC) and the steady-state target intake-air-passage internal pressure (stP); and
   (j) calculating the target intake-valve closure timing (tIVC) based on both the target engine torque (tTe) and the real intake-air-passage internal pressure (rP).

2. The intake-air quantity control apparatus as claimed in claim 1, wherein the basic intake-valve closure timing (IVCb) is an intake-valve closure timing at which a maximum charging efficiency of intake air entering the engine is obtained.

3. The intake-air quantity control apparatus as claimed in claim 1, wherein the basic pressure (Pb) is set at a pressure level substantially corresponding to an atmospheric pressure.

4. The intake-air quantity control apparatus as claimed in claim 1, wherein said microprocessor is further programmed for:
   (k) calculating a first response time constant (Ta) based on the basic intake-valve closure timing (IVCb), the first response time constant (Ta) indicating a time constant determining a response delay of a change in the internal pressure in the intake-air passage with respect to a change in the throttle opening of said throttle valve; and
   (l) calculating the target engine torque (tTe) by making a first-order lag processing of the first response time constant (Ta) to the steady-state target engine torque (stTe).

5. The intake-air quantity control apparatus as claimed in claim 1, wherein said microprocessor is further programmed for:

(m) calculating a second response time constant (Tb) based on the target intake-valve closure timing (tIVC), the second response time constant (Tb) indicating a time constant determining a response delay of a change in the internal pressure in the intake-air passage with respect to a change in the throttle opening of said throttle valve; and (n) calculating the real intake-air-passage internal pressure (rP) by making a first-order lag processing of the second response time constant (Tb) to the steady-state target intake-air-passage internal pressure (stP).

6. The intake-air quantity control apparatus as claimed in claim 1, which further comprises a pressure sensor sending a sensor signal indicative of a real internal pressure in the intake-air passage to said microprocessor, and wherein said microprocessor is further programmed for:

(o) obtaining the real intake-air-passage internal pressure (rP) based on the sensor signal from said pressure sensor.

7. An intake-air quantity control apparatus for an internal combustion engine with a variable valve timing system comprising:

a throttle valve disposed in an intake-air passage of the engine and controlled so that a throttle opening of said throttle valve is brought closer to a target throttle opening (tTVO);

an intake valve disposed between the intake-air passage and a combustion chamber of the engine and controlled so that an intake-valve closure timing of said intake valve is brought close to a target intake-valve closure timing (tIVC); and a microprocessor programmed to perform the following:

(a) selecting one of a first control mode in which an intake-air quantity of the engine is controlled by adjusting the throttle opening of said throttle valve, and a second control mode in which an intake-air quantity of the engine is controlled by adjusting the intake-valve closure timing of said intake valve;

(b) calculating a steady-state target intake-air quantity (stQH01) based on operating conditions (APS, Ne) of the engine, the steady-state target intake-air quantity (stQH01) indicating a steady-state target value of intake-air quantity needed when the first control mode is selected;

(c) calculating a target intake-air quantity (tQH02) based on the steady-state target intake-air quantity (stQH01), the target intake-air quantity (tQH02) indicating a target value of intake-air quantity needed when the second control mode is selected;

(d) calculating the target throttle opening (tTVO) based on the steady-state target intake-air quantity (stQH01) when the first control mode is selected;

(e) setting the target intake-valve closure timing (tIVC) at a basic intake-valve closure timing (IVCb) when the first control mode is selected;

(f) setting the target throttle opening (tTVO) at a predetermined throttle opening when the second control mode is selected, the predetermined throttle opening indicating a throttle opening of said throttle valve at which the internal pressure in the intake-air passage becomes the basic pressure (Pb); and (g) calculating the target intake-valve closure timing (tIVC) based on the target intake-air quantity (tQH02) when the second control mode is selected.

8. The intake-air quantity control apparatus as claimed in claim 7, wherein the basic intake-valve closure timing (IVCb) is an intake-valve closure timing at which a maximum charging efficiency of intake air entering the engine is obtained.

9. The intake-air quantity control apparatus as claimed in claim 7, wherein the basic pressure (Pb) is set at a pressure level substantially corresponding to an atmospheric pressure.

10. The intake-air quantity control apparatus as claimed in claim 7, wherein said microprocessor is further programmed for:

(h) calculating a first response time constant (Ta) based on the basic intake-valve closure timing (IVCb), the first response time constant (Ta) indicating a time constant determining a response delay of a change in the internal pressure in the intake-air passage with respect to a change in the throttle opening of said throttle valve;

(i) calculating a real intake-air quantity (rQH01) by making a first-order lag processing of the first response time constant (Ta) to the steady-state target intake-air quantity (stQH01); and (j) calculating the target intake-air quantity (tQH02) by making a first compensation to the real intake-air quantity (rQH01), the first compensation being based on a pumping-loss difference correction factor (PUMP1) indicative of a difference in pumping loss between the first and second control modes.

11. The intake-air quantity control apparatus as claimed in claim 7, wherein said microprocessor is further programmed for:

(h) calculating a first response time constant (Ta) based on the basic intake-valve closure timing (IVCb), the first response time constant (Ta) indicating a time constant determining a response delay of a change in the internal pressure in the intake-air passage with respect to a change in the throttle opening of said throttle valve;

(i) calculating a real intake-air quantity (rQH01) by making a first-order lag processing of the first response time constant (Ta) to the steady-state target intake-air quantity (stQH01); and (j) calculating the target intake-air quantity (tQH02) by making a second compensation to the real intake-air quantity (rQH01), the second compensation being based on a combustion-efficiency difference correction factor (k) indicative of a difference in combustion efficiency between the first and second control modes.

12. The intake-air quantity control apparatus as claimed in claim 7, wherein said microprocessor is further programmed for:

(h) calculating a mode-switching period target intake-air quantity (tQH03) needed during switching between the first and second control modes, the mode-switching period target intake-air quantity (tQH03) indicating a target value of intake-air quantity needed during switching between the first and second control modes;

(i) calculating the target intake-valve closure timing (tIVC) needed during switching between the first and second control modes on the basis of the mode-switching period target intake-air quantity (tQH03) when switching between the first and second control modes occurs.

13. The intake-air quantity control apparatus as claimed in claim 12, wherein said microprocessor is further programmed for:

(j) calculating a first response time constant (Ta) based on the basic intake-valve closure timing (IVCb), the first response time constant (Ta) indicating a time constant determining a response delay of a change in the internal pressure in the intake-air passage with respect to a change in the throttle opening of said throttle valve;

(k) calculating a real intake-air quantity (rQH01) by making a first-order lag processing of the first response time constant (Ta) to the steady-state target intake-air quantity (stQH01); and (l) calculating the mode-switching period target intake-air quantity (tQH03) based on both the target intake-air quantity (tQH02) and the real intake-air quantity (rQH01).

14. The intake-air quantity control apparatus as claimed in claim 13, wherein said microprocessor is further programmed for:

(m) calculating a second response time constant (Tb) based on the target intake-valve closure timing (tIVC), the second response time constant (Tb) indicating a time constant determining a response delay of a change in the internal pressure in the intake-air passage with respect to a change in the throttle opening of said throttle valve;

(n) calculating the mode-switching period target intake-air quantity (tQH03) by making a first-order lag processing of the second response time constant (Tb) to the real intake-air quantity (rQH01) calculated just before switching to the second control mode and the target intake-air quantity (tQH02) calculated after switching to the second control mode when an intake-air control mode is switched from the first control mode to the second control mode; and (o) calculating the mode-switching period target intake-air quantity (tQH03) by making a first-order lag processing of the second response time constant (Tb) to the target intake-air quantity (tQH02) calculated just before switching to the first control mode and the real intake-air quantity (rQH01) calculated after switching to the first control mode when the intake-air control mode is switched from the second control mode to the first control mode.

15. The intake-air quantity control apparatus as claimed in claim 14, wherein said microprocessor is further programmed for:

(p) calculating a steady-state target intake-air-passage internal pressure (stP) based on the steady-state target intake-air quantity (stQH01) when the first control mode is selected, the steady-state target intake-air-passage internal pressure (stP) indicating a steady-state target value of the internal pressure in the intake-air passage;

(q) setting the steady-state target intake-air-passage internal pressure (stP) at the basic pressure (Pb) when the second control mode is selected;

(r) calculating a temporary intake-valve closure timing (IVC0) based on both the mode-switching period target intake-air quantity (tQH03) and the steady-state target intake-air-passage internal pressure (stp), the temporary intake-valve closure timing (IVC0) indicating such an intake-valve closure timing that an intake-air quantity becomes the mode-switching period target intake-air quantity (tQH03) under a particular condition where the internal pressure in the intake-air passage is identical to the steady-state target intake-air-passage internal pressure (stP); and (s) calculating the target intake-valve closure timing (tIVC) needed during switching between the first and second control modes by making a first-order lag processing of the second response time constant (Tb) to the temporary intake-valve closure timing (IVC0) when switching between the first and second control modes occurs.

16. The intake-air quantity control apparatus as claimed in claim 12, which further comprises a pressure sensor sensing a real intake-air-passage internal pressure (rP) indicative of an actual internal pressure in the intake-air passage, and wherein said microprocessor is further programmed for:

(j) calculating the target intake-valve closure timing (tIVC) needed during switching between the first and second control modes based on both the mode-switching period target intake-air quantity (tQH03) and the real intake-air-passage internal pressure (rP) when switching between the first and second control modes occurs.

17. An intake-air quantity control apparatus for an internal combustion engine with a variable valve timing system comprising:

a throttle valve disposed in an intake-air passage of the engine and controlled so that a throttle opening of said throttle valve is brought closer to a target throttle opening (tTVO);

an intake valve disposed between the intake-air passage and a combustion chamber of the engine and controlled so that an intake-valve closure timing of said intake valve is brought close to a target intake-valve closure timing (tIVC); and a microprocessor programmed to perform the following:

(a) selecting one of a first control mode in which an intake-air quantity of the engine is controlled by adjusting the throttle opening of said throttle valve, and a second control mode in which an intake-air quantity of the engine is controlled by adjusting the intake-valve closure timing of said intake valve;

(b) calculating a desired value of the intake-air quantity based on operating conditions (APS, Ne) of the engine, in accordance with a predetermined time-delay characteristic between initiation of adjustment of the throttle opening of said throttle valve and an actual change in an internal pressure in the intake-air passage;

(c) calculating a target throttle opening (tTVO) based on the operating conditions when the first control mode is selected;

(d) setting a target intake-valve closure timing (tIVC) at a basic intake-valve closure timing (IVCb) when the first control mode is selected;

(e) setting the target throttle opening (tTVO) at a predetermined throttle opening when the second control mode is selected; and (f) calculating the target intake-valve closure timing (tIVC) based on the desired value of the intake-air quantity when the second control mode is selected.

18. The intake-air quantity control apparatus as claimed in claim 17, wherein the basic intake-valve closure timing (IVCb) is an intake-valve closure timing at which a maximum charging efficiency of intake air entering the engine is obtained.

19. The intake-air quantity control apparatus as claimed in claim 17, wherein the basic pressure (Pb) is set at a pressure level substantially corresponding to an atmospheric pressure.

20. The intake-air quantity control apparatus as claimed in claim 17, wherein said microprocessor is further programmed for:

(g) calculating a response time constant (Ta) based on the basic intake-valve closure timing (IVCb), the response time constant (Ta) indicating a time constant determining a response delay of a change in the internal pressure in the intake-air passage with respect to a change in the throttle opening of said throttle valve; and (h) calculating the desired value of the intake-air quantity by making a first-order lag processing of the response time constant (Ta) to a steady-state target intake-air quantity (stQH01) based on the operating conditions of the engine.

21. The intake-air quantity control apparatus as claimed in claim 20, wherein said microprocessor is further programmed for:

(i) calculating the desired intake-air quantity by making at least one of first and second compensations to the real intake-air quantity (rQH01), the first compensation being based on a pumping-loss difference correction factor (PUMP1) indicative of a difference in pumping loss between the first and second control modes, and the second compensation being based on a combustion-efficiency difference correction factor (k) indicative of a difference in combustion efficiency between the first and second control modes.

* * * * *